United States Patent
Shafaat et al.

(10) Patent No.: US 6,956,995 B1
(45) Date of Patent: Oct. 18, 2005

(54) OPTICAL COMMUNICATION ARRANGEMENT

(75) Inventors: Syed Tariq Shafaat, Freeland, WA (US); Clinton B. Carlisle, Palo Alto, CA (US); Marc Hartranft, Scotts Valley, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 407 days.

(21) Appl. No.: 10/232,790

(22) Filed: Aug. 28, 2002

Related U.S. Application Data
(60) Provisional application No. 60/345,335, filed on Nov. 9, 2001.

(51) Int. Cl.[7] .............. G02B 6/26; G02B 6/32; G02B 6/42
(52) U.S. Cl. .............. 385/39; 385/33; 385/93; 385/89
(58) Field of Search .............. 385/39, 88, 92–94, 385/33, 52, 89

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai ............... 178/5.4 |
| 2,783,406 A | 2/1957 | Vanderhooft ........... 313/70 |
| 2,920,529 A | 1/1960 | Blythe ................ 88/73 |
| 2,991,690 A | 7/1961 | Grey et al. ........... 88/16.6 |
| RE25,169 E | 5/1962 | Glenn |
| 3,256,465 A | 6/1966 | Weissenstern et al. ...... 317/101 |
| 3,388,301 A | 6/1968 | James ................ 317/234 |
| 3,443,871 A | 5/1969 | Chitayat ............. 356/106 |
| 3,553,364 A | 1/1971 | Lee .................. 178/7.3 |

(Continued)

FOREIGN PATENT DOCUMENTS

| | | | |
|---|---|---|---|
| DE | 32 33 195 A1 | 3/1983 | .......... H01L/23/52 |

(Continued)

OTHER PUBLICATIONS

R. Apte, "Grating Light Valves for High Resolution Displays", Solid State Sensors and Actuators Workshop, Ph D, Dissertation Stanford University (Jun. 1994).

O. Solgaard, "Integrated Semiconductor Light Modulators for Fiber–Optic and Display Applications", Ph.D. Dissertation, Stanford University Feb., 1992.

(Continued)

*Primary Examiner*—Edward J. Glick
*Assistant Examiner*—Krystyna Suchecki
(74) *Attorney, Agent, or Firm*—Okamoto & Benedicto LLP

(57) ABSTRACT

An arrangement for optical communication comprises an optical coupler, an opto-electronic board, and an optical fiber. The optical fiber comprises a first refraction surface, a second refraction surface, and an internal reflector. The first refraction surface has a first finite focal length. The second refraction surface has a second finite focal length. In operation, an optical signal enters the first refraction surface, couples from the first refraction surface to the second refraction surface via the internal reflector, and exits the second refraction surface, where the optical signal defines a light path. The light path optically couples the opto-electronic board to the optical fiber.

26 Claims, 20 Drawing Sheets

U.S. PATENT DOCUMENTS

| | | |
|---|---|---|
| 3,576,394 A | 4/1971 | Lee ................................ 178/7.3 |
| 3,600,798 A | 8/1971 | Lee .................................. 29/592 |
| 3,656,837 A | 4/1972 | Sandbank ...................... 350/161 |
| 3,657,610 A | 4/1972 | Yamamoto et al. ........... 317/243 |
| 3,693,239 A | 9/1972 | Dix ................................ 29/470 |
| 3,743,507 A | 7/1973 | Ih et al. .......................... 96/81 |
| 3,752,563 A | 8/1973 | Torok et al. ................... 350/151 |
| 3,781,465 A | 12/1973 | Emstoff et al. ........... 178/5.4 BD |
| 3,783,184 A | 1/1974 | Emstoff et al. ........... 178/5.4 BD |
| 3,792,916 A | 2/1974 | Sarna ............................ 350/163 |
| 3,802,769 A | 4/1974 | Rotz et al. ...................... 352/43 |
| 3,811,186 A | 5/1974 | Lamerd et al. ................. 29/626 |
| 3,861,784 A | 1/1975 | Torok ........................ 350/162 R |
| 3,862,360 A | 1/1975 | Dill et al. .................... 178/7.3 D |
| 3,871,014 A | 3/1975 | King et al. ...................... 357/67 |
| 3,886,310 A | 5/1975 | Guldberg et al. ........... 178/7.5 D |
| 3,896,338 A | 7/1975 | Nathanson et al. ........... 315/373 |
| 3,915,548 A | 10/1975 | Opittek ......................... 350/3.5 |
| 3,935,499 A | 1/1976 | Oess ............................. 313/413 |
| 3,935,500 A | 1/1976 | Oess et al. .................... 313/495 |
| 3,938,881 A | 2/1976 | Biegelsen et al. ............. 350/161 |
| 3,941,456 A | 3/1976 | Schilz et al. .................. 350/161 |
| 3,942,245 A | 3/1976 | Jackson et al. ................. 29/591 |
| 3,943,281 A | 3/1976 | Keller et al. ................ 178/7.5 D |
| 3,947,105 A | 3/1976 | Smith ........................... 353/121 |
| 3,969,611 A | 7/1976 | Fonteneau ..................... 219/502 |
| 3,980,476 A | 9/1976 | Wysocki ......................... 96/1.1 |
| 3,991,416 A | 11/1976 | Byles et al. ................ 340/324 R |
| 4,001,663 A | 1/1977 | Bray ................................ 321/2 |
| 4,004,849 A | 1/1977 | Shattuck .................... 350/160 R |
| 4,006,968 A | 2/1977 | Ernstoff et al. .......... 350/160 LC |
| 4,009,939 A | 3/1977 | Okano .................... 350/162 SF |
| 4,011,009 A | 3/1977 | Lama et al. .............. 350/162 R |
| 4,012,116 A | 3/1977 | Yevick .......................... 350/132 |
| 4,012,835 A | 3/1977 | Wallick .......................... 29/591 |
| 4,017,158 A | 4/1977 | Booth ...................... 350/162 SF |
| 4,020,381 A | 4/1977 | Oess et al. .................... 313/302 |
| 4,021,766 A | 5/1977 | Aine ................................ 338/2 |
| 4,034,211 A | 7/1977 | Horst et al. .............. 235/61.12 N |
| 4,034,399 A | 7/1977 | Drukier et al. .................. 357/68 |
| 4,035,068 A | 7/1977 | Rawson ........................ 353/122 |
| 4,067,129 A | 1/1978 | Abramson et al. ............. 40/563 |
| 4,084,437 A | 4/1978 | Finnegan ....................... 73/361 |
| 4,090,219 A | 5/1978 | Ernstoff et al. ................. 358/59 |
| 4,093,346 A | 6/1978 | Nishino et al. .......... 350/162 SF |
| 4,093,921 A | 6/1978 | Buss ............................. 325/459 |
| 4,093,922 A | 6/1978 | Buss ............................. 325/459 |
| 4,100,579 A | 7/1978 | Ernstoff ........................ 358/230 |
| 4,103,273 A | 7/1978 | Keller ............................. 338/2 |
| 4,126,380 A | 11/1978 | Borm ........................... 350/266 |
| 4,127,322 A | 11/1978 | Jacobson et al. ............... 353/31 |
| 4,135,502 A | 1/1979 | Peck ........................... 128/76.5 |
| 4,139,257 A | 2/1979 | Matsumoto .................... 350/6.1 |
| 4,143,943 A | 3/1979 | Rawson ........................ 350/120 |
| 4,163,570 A | 8/1979 | Greenaway ................... 283/8 A |
| 4,184,700 A | 1/1980 | Greenaway ..................... 283/6 |
| 4,185,891 A | 1/1980 | Kaestner ...................... 350/167 |
| 4,190,855 A | 2/1980 | Inoue ............................ 357/80 |
| 4,195,915 A | 4/1980 | Lichty et al. .................. 350/345 |
| 4,205,428 A | 6/1980 | Ernstoff et al. ............. 29/592 R |
| 4,211,918 A | 7/1980 | Nyfeler et al. ................ 235/454 |
| 4,223,050 A | 9/1980 | Nyfeler et al. ................ 427/163 |
| 4,225,913 A | 9/1980 | Bray ............................. 363/97 |
| 4,249,796 A | 2/1981 | Sincerbox et al. ............ 350/370 |
| 4,250,217 A | 2/1981 | Greenaway .................... 428/161 |
| 4,250,393 A | 2/1981 | Greenaway ................... 250/566 |
| 4,256,787 A | 3/1981 | Shaver et al. .................... 428/1 |
| 4,257,016 A | 3/1981 | Kramer, Jr. et al. ........ 322/7.51 |
| 4,290,672 A | 9/1981 | Whitefield ................... 350/358 |
| 4,295,145 A | 10/1981 | Latta ............................ 346/108 |
| 4,311,999 A | 1/1982 | Upton et al. .................. 340/755 |
| 4,327,411 A | 4/1982 | Turner ......................... 364/900 |
| 4,327,966 A | 5/1982 | Bloom ..................... 350/162 R |
| 4,331,972 A | 5/1982 | Rajchman ..................... 358/60 |
| 4,336,982 A | 6/1982 | Rector, Jr. .................... 350/358 |
| 4,338,660 A | 7/1982 | Kelley et al. ................. 364/200 |
| 4,343,535 A | 8/1982 | Bleha, Jr. ..................... 350/342 |
| 4,346,965 A | 8/1982 | Sprague et al. .............. 350/358 |
| 4,348,079 A | 9/1982 | Johnson ....................... 350/358 |
| 4,355,463 A | 10/1982 | Burns ............................ 29/827 |
| 4,361,384 A | 11/1982 | Bosserman .................. 350/174 |
| 4,369,524 A | 1/1983 | Rawson et al. .............. 455/606 |
| 4,374,397 A | 2/1983 | Mir ................................ 358/75 |
| 4,389,096 A | 6/1983 | Hori et al. ............... 350/339 R |
| 4,391,490 A | 7/1983 | Hartke ......................... 350/356 |
| 4,396,246 A | 8/1983 | Holman .................... 350/96.14 |
| 4,398,798 A | 8/1983 | Krawczak et al. ...... 350/162.24 |
| 4,400,740 A | 8/1983 | Traino et al. ................. 358/293 |
| 4,408,884 A | 10/1983 | Kleinknecht et al. ........ 356/355 |
| 4,414,583 A | 11/1983 | Hooker, III ................. 358/300 |
| 4,417,386 A | 11/1983 | Exner ........................... 29/590 |
| 4,418,397 A | 11/1983 | Brantingham et al. ....... 364/900 |
| 4,420,717 A | 12/1983 | Wallace et al. .............. 318/696 |
| 4,422,099 A | 12/1983 | Wolfe .......................... 358/293 |
| 4,426,768 A | 1/1984 | Black et al. ................... 29/583 |
| 4,430,584 A | 2/1984 | Someshwar et al. ......... 307/465 |
| 4,435,041 A | 3/1984 | Torok et al. ............. 350/162.24 |
| 4,440,839 A | 4/1984 | Mottier .......................... 430/2 |
| 4,443,819 A | 4/1984 | Funada et al. ............... 358/236 |
| 4,443,845 A | 4/1984 | Hamilton et al. ............. 364/200 |
| 4,447,881 A | 5/1984 | Brantingham et al. ....... 364/488 |
| 4,454,591 A | 6/1984 | Lou ............................. 364/900 |
| 4,456,338 A | 6/1984 | Gelbart ........................ 350/358 |
| 4,460,907 A | 7/1984 | Nelson ..................... 346/153.1 |
| 4,462,046 A | 7/1984 | Spight ......................... 358/101 |
| 4,467,342 A | 8/1984 | Tower ........................... 357/30 |
| 4,468,725 A | 8/1984 | Venturini ..................... 363/160 |
| 4,483,596 A | 11/1984 | Marshall ...................... 350/385 |
| 4,484,188 A | 11/1984 | Ott ............................... 340/728 |
| 4,487,677 A | 12/1984 | Murphy ........................ 204/247 |
| 4,492,435 A | 1/1985 | Banton et al. ................ 350/360 |
| 4,503,494 A | 3/1985 | Hamilton et al. ............. 364/200 |
| 4,511,220 A | 4/1985 | Scully ........................... 350/403 |
| 4,538,883 A | 9/1985 | Sprague et al. .............. 350/356 |
| 4,545,610 A | 10/1985 | Lakritz et al. ................ 29/589 |
| 4,556,378 A | 12/1985 | Nyfeler et al. ............... 425/143 |
| 4,558,171 A | 12/1985 | Gantley et al. .......... 174/52 FP |
| 4,561,044 A | 12/1985 | Ogura et al. .................... 362/84 |
| 4,566,935 A | 1/1986 | Hornbeck .................... 156/626 |
| 4,567,585 A | 1/1986 | Gelbart .......................... 369/97 |
| 4,571,041 A | 2/1986 | Gaudyn ......................... 353/10 |
| 4,571,603 A | 2/1986 | Hornbeck et al. ............ 346/160 |
| 4,577,932 A | 3/1986 | Gelbart ........................ 350/358 |
| 4,577,933 A | 3/1986 | Yip et al. ..................... 350/358 |
| 4,588,957 A | 5/1986 | Balant et al. ................. 330/4.3 |
| 4,590,548 A | 5/1986 | Maytum ...................... 363/161 |
| 4,594,501 A | 6/1986 | Culley et al. ................. 219/492 |
| 4,596,992 A | 6/1986 | Hornbeck ................. 346/76 PH |
| 4,615,595 A | 10/1986 | Hornbeck ..................... 353/122 |
| 4,623,219 A | 11/1986 | Trias ............................ 350/351 |
| 4,636,039 A | 1/1987 | Turner ......................... 350/356 |
| 4,636,866 A | 1/1987 | Hattori ......................... 358/236 |
| 4,641,193 A | 2/1987 | Glenn .......................... 358/233 |
| 4,645,881 A | 2/1987 | LeToumelin et al. ........ 379/252 |
| 4,646,158 A | 2/1987 | Ohno et al. .................. 358/236 |
| 4,649,085 A | 3/1987 | Landram ..................... 428/620 |
| 4,649,432 A | 3/1987 | Watanabe et al. ............ 358/241 |
| 4,652,932 A | 3/1987 | Miyajima et al. ............ 358/236 |
| 4,655,539 A | 4/1987 | Caulfield et al. .............. 350/3.6 |
| 4,660,938 A | 4/1987 | Kazan .......................... 350/355 |
| 4,661,828 A | 4/1987 | Miller, Jr. et al. ............ 346/108 |

| | | | | | | |
|---|---|---|---|---|---|---|
| 4,662,746 A | 5/1987 | Hornbeck ............... 350/269 | | 4,984,824 A | 1/1991 | Antes et al. ............. 283/91 |
| 4,663,670 A | 5/1987 | Ito et al. ................. 358/245 | | 4,999,308 A | 3/1991 | Nishiura et al. ........... 437/4 |
| 4,687,326 A | 8/1987 | Corby, Jr. .................... 356/5 | | 5,003,300 A | 3/1991 | Wells ..................... 340/705 |
| 4,698,602 A | 10/1987 | Armitage ............... 332/7.51 | | 5,009,473 A | 4/1991 | Hunter et al. ............ 350/6.6 |
| 4,700,276 A | 10/1987 | Freyman et al. ......... 361/403 | | 5,013,141 A | 5/1991 | Sakata ................... 350/348 |
| 4,707,064 A | 11/1987 | Dobrowolski et al. ... 350/96.19 | | 5,018,256 A | 5/1991 | Hornbeck ............... 29/25.01 |
| 4,709,995 A | 12/1987 | Kuribayashi et al. ...... 350/350 | | 5,022,750 A | 6/1991 | Flasck ..................... 353/31 |
| 4,710,732 A | 12/1987 | Hornbeck ............... 332/7.51 | | 5,023,905 A | 6/1991 | Wells et al. .............. 379/96 |
| 4,711,526 A | 12/1987 | Hennings et al. ........ 350/170 | | 5,024,494 A | 6/1991 | Williams et al. ......... 350/3.6 |
| 4,714,326 A | 12/1987 | Usui et al. ............... 350/485 | | 5,028,939 A | 7/1991 | Hornbeck et al. ........ 346/160 |
| 4,717,066 A | 1/1988 | Goldenberg et al. ....... 228/179 | | 5,031,144 A | 7/1991 | Persky |
| 4,719,507 A | 1/1988 | Bos ......................... 358/92 | | 5,035,473 A | 7/1991 | Kuwayama et al. ........ 350/3.7 |
| 4,721,629 A | 1/1988 | Sakai et al. ............... 427/35 | | 5,037,173 A | 8/1991 | Sampsell et al. ............ 385/17 |
| 4,722,593 A | 2/1988 | Shimazaki ............... 350/336 | | 5,039,628 A | 8/1991 | Carey ..................... 437/183 |
| 4,724,467 A | 2/1988 | Yip et al. ................... 355/71 | | 5,040,052 A | 8/1991 | McDavid ................... 357/80 |
| 4,728,185 A | 3/1988 | Thomas ................... 353/122 | | 5,041,395 A | 8/1991 | Steffen .................... 437/206 |
| 4,743,091 A | 5/1988 | Gelbart ................... 350/252 | | 5,041,851 A | 8/1991 | Nelson .................... 346/160 |
| 4,744,633 A | 5/1988 | Sheiman ................... 350/132 | | 5,043,917 A | 8/1991 | Okamoto ................. 364/518 |
| 4,747,671 A | 5/1988 | Takahashi et al. ......... 350/336 | | 5,048,077 A | 9/1991 | Wells et al. .............. 379/96 |
| 4,751,509 A | 6/1988 | Kubota et al. ............ 340/784 | | 5,049,901 A | 9/1991 | Gelbart ................... 346/108 |
| 4,761,253 A | 8/1988 | Antes ....................... 264/1.3 | | 5,058,992 A | 10/1991 | Takahashi ................. 359/567 |
| 4,763,975 A | 8/1988 | Scifres et al. ........... 350/96.15 | | 5,060,058 A | 10/1991 | Goldenberg et al. ......... 358/60 |
| 4,765,865 A | 8/1988 | Gealer et al. ............. 156/647 | | 5,061,049 A | 10/1991 | Hornbeck ............... 359/224 |
| 4,772,094 A | 9/1988 | Sheiman ................... 350/133 | | 5,066,614 A | 11/1991 | Dunnaway et al. ........ 437/209 |
| 4,797,694 A | 1/1989 | Agostinelli et al. ......... 346/160 | | 5,068,205 A | 11/1991 | Baxter et al. .............. 437/205 |
| 4,797,918 A | 1/1989 | Lee et al. ................... 380/20 | | 5,072,239 A | 12/1991 | Mitcham et al. ............ 346/108 |
| 4,801,194 A | 1/1989 | Agostinelli et al. ......... 350/356 | | 5,072,418 A | 12/1991 | Boutaud et al. ........ 364/715.06 |
| 4,803,560 A | 2/1989 | Matsunaga et al. ......... 359/236 | | 5,074,947 A | 12/1991 | Estes et al. ............. 156/307.3 |
| 4,804,641 A | 2/1989 | Arlt et al. ................. 437/227 | | 5,075,940 A | 12/1991 | Kuriyama et al. ......... 29/25.03 |
| 4,807,021 A | 2/1989 | Okumura ................... 357/75 | | 5,079,544 A | 1/1992 | DeMond et al. ............ 340/701 |
| 4,807,965 A | 2/1989 | Garakani ................. 350/131 | | 5,081,617 A | 1/1992 | Gelbart ................... 369/112 |
| 4,809,078 A | 2/1989 | Yabe et al. ................ 358/236 | | 5,083,857 A | 1/1992 | Hornbeck ............... 359/291 |
| 4,811,082 A | 3/1989 | Jacobs et al. ............... 357/80 | | 5,085,497 A | 2/1992 | Um et al. .................. 359/848 |
| 4,811,210 A | 3/1989 | McAulay ................. 364/200 | | 5,089,903 A | 2/1992 | Kuwayama et al. ......... 359/15 |
| 4,814,759 A | 3/1989 | Gombrich et al. .......... 340/771 | | 5,093,281 A | 3/1992 | Eshima .................... 437/217 |
| 4,817,850 A | 4/1989 | Wiener-Avnear et al. ... 228/119 | | 5,096,279 A | 3/1992 | Hornbeck et al. .......... 359/230 |
| 4,824,200 A | 4/1989 | Isono et al. ............. 350/96.16 | | 5,099,353 A | 3/1992 | Hornbeck ............... 359/291 |
| 4,827,391 A | 5/1989 | Sills ........................ 336/41 | | 5,101,184 A | 3/1992 | Antes ..................... 235/454 |
| 4,829,365 A | 5/1989 | Eichenlaub ................... 358/3 | | 5,101,236 A | 3/1992 | Nelson et al. ............. 355/229 |
| 4,836,649 A | 6/1989 | Ledebuhr et al. ......... 350/331 R | | 5,103,334 A | 4/1992 | Swanberg ................. 359/197 |
| 4,856,863 A | 8/1989 | Sampsell et al. ......... 350/96.16 | | 5,105,207 A | 4/1992 | Nelson .................... 346/160 |
| 4,856,869 A | 8/1989 | Sakata et al. ............ 350/162.18 | | 5,105,299 A | 4/1992 | Anderson et al. ........... 359/223 |
| 4,859,012 A | 8/1989 | Cohn ..................... 350/96.24 | | 5,105,369 A | 4/1992 | Nelson .................... 364/525 |
| 4,859,060 A | 8/1989 | Katagiri et al. ............. 356/352 | | 5,107,372 A | 4/1992 | Gelbart et al. ............. 359/824 |
| 4,866,488 A | 9/1989 | Frensley .................... 357/46 | | 5,112,436 A | 5/1992 | Bol ........................ 156/643 |
| 4,882,683 A | 11/1989 | Rupp et al. ............... 364/521 | | 5,113,272 A | 5/1992 | Reamey .................... 359/53 |
| 4,893,509 A | 1/1990 | MacIver et al. ......... 73/517 AV | | 5,113,285 A | 5/1992 | Franklin et al. ............ 359/465 |
| 4,896,325 A | 1/1990 | Coldren .................... 372/20 | | 5,115,344 A | 5/1992 | Jaskie ..................... 359/573 |
| 4,896,948 A | 1/1990 | Dono et al. ............... 350/355 | | 5,119,204 A | 6/1992 | Hashimoto et al. ......... 358/254 |
| 4,897,708 A | 1/1990 | Clements ................... 357/65 | | 5,121,343 A | 6/1992 | Faris ...................... 395/111 |
| 4,902,083 A | 2/1990 | Wells ...................... 350/6.6 | | 5,126,812 A | 6/1992 | Greiff ...................... 357/25 |
| 4,915,463 A | 4/1990 | Barbee, Jr. ................ 350/1.1 | | 5,126,826 A | 6/1992 | Kauchi et al. .............. 357/72 |
| 4,915,479 A | 4/1990 | Clarke .................... 350/345 | | 5,126,836 A | 6/1992 | Um ....................... 358/60 |
| 4,924,413 A | 5/1990 | Suwannukul .............. 364/521 | | 5,128,660 A | 7/1992 | DeMond et al. ........... 340/707 |
| 4,926,241 A | 5/1990 | Carey ...................... 357/75 | | 5,129,716 A | 7/1992 | Holakovszky et al. ........ 351/50 |
| 4,930,043 A | 5/1990 | Wiegand ................. 361/283 | | 5,132,723 A | 7/1992 | Gelbart .................... 355/40 |
| 4,934,773 A | 6/1990 | Becker .................... 350/6.6 | | 5,132,812 A | 7/1992 | Takahashi et al. ............ 359/9 |
| 4,940,309 A | 7/1990 | Baum ..................... 350/171 | | 5,136,695 A | 8/1992 | Goldshlag et al. .......... 395/275 |
| 4,943,815 A | 7/1990 | Aldrich et al. ............. 346/108 | | 5,137,836 A | 8/1992 | Lam ....................... 437/8 |
| 4,945,773 A | 8/1990 | Sickafus .................. 73/862.59 | | 5,142,303 A | 8/1992 | Nelson .................... 346/108 |
| 4,949,148 A | 8/1990 | Bartelink .................. 357/74 | | 5,142,405 A | 8/1992 | Hornbeck ............... 359/226 |
| 4,950,890 A | 8/1990 | Gelbart ................... 250/237 G | | 5,142,677 A | 8/1992 | Ehlig et al. ............... 395/650 |
| 4,952,925 A | 8/1990 | Haastert .................. 340/784 | | 5,144,472 A | 9/1992 | Sang, Jr. et al. ............ 359/254 |
| 4,954,789 A | 9/1990 | Sampsell ................. 330/4.3 | | 5,147,815 A | 9/1992 | Casto ...................... 437/51 |
| 4,956,619 A | 9/1990 | Hornbeck ................. 330/4.3 | | 5,148,157 A | 9/1992 | Florence .................. 340/783 |
| 4,961,633 A | 10/1990 | Ibrahim et al. ............ 350/392 | | 5,148,506 A | 9/1992 | McDonald ................. 385/16 |
| 4,963,012 A | 10/1990 | Tracy et al. ............... 350/641 | | 5,149,405 A | 9/1992 | Bruns et al. ............ 204/129.1 |
| 4,970,575 A | 11/1990 | Soga et al. ................. 357/72 | | 5,150,205 A | 9/1992 | Um et al. ................. 358/60 |
| 4,978,202 A | 12/1990 | Yang .................... 350/331 R | | 5,151,718 A | 9/1992 | Nelson .................... 346/160 |
| 4,982,184 A | 1/1991 | Kirkwood ................ 340/783 | | 5,151,724 A | 9/1992 | Kikinis ..................... 357/17 |
| 4,982,265 A | 1/1991 | Watanabe et al. ............ 357/75 | | 5,151,763 A | 9/1992 | Marek et al. ............... 357/26 |

| Patent No. | Date | Inventor | Class |
|---|---|---|---|
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,185,823 A | 2/1993 | Kaku et al. | |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| D334,557 S | 4/1993 | Hunter et al. | D14/114 |
| D334,742 S | 4/1993 | Hunter et al. | D14/113 |
| 5,202,785 A | 4/1993 | Nelson | 359/214 |
| 5,206,629 A | 4/1993 | DeMond et al. | 340/719 |
| 5,206,829 A | 4/1993 | Thakoor et al. | |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/291 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| D337,320 S | 7/1993 | Hunter et al. | D14/113 |
| 5,226,099 A | 7/1993 | Mignardi et al. | 385/19 |
| 5,229,597 A | 7/1993 | Fukatsu | |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/293 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/67 |
| 5,296,950 A | 3/1994 | Lin et al. | 359/9 |
| 5,298,460 A | 3/1994 | Nishiguchi et al. | 437/183 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,315,429 A | 5/1994 | Abramov | |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |

| Patent No. | Date | Inventor | Class |
|---|---|---|---|
| 5,351,052 A | 9/1994 | D'Hont et al. | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,371,543 A | 12/1994 | Anderson | 348/270 |
| 5,371,618 A | 12/1994 | Tai et al. | 359/53 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,677 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/573 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |

| Patent No. | Date | Inventor | Class |
|---|---|---|---|
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,773,473 A | 6/1998 | Green et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,901,262 A * | 5/1999 | Kobayashi et al. | 385/89 |
| 5,903,243 A | 5/1999 | Jones | 345/7 |
| 5,903,395 A | 5/1999 | Rallison et al. | 359/630 |
| 5,910,856 A | 6/1999 | Ghosh et al. | 359/201 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,249,381 B1 | 6/2001 | Suganuma | |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |

| | | | |
|---|---|---|---|
| 6,271,808 B1 | 8/2001 | Corbin | 345/7 |
| 6,274,469 B1 | 8/2001 | Yu | 438/592 |
| 6,282,213 B1 | 8/2001 | Gutin et al. | |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,313,901 B1 | 11/2001 | Cacharelis | |
| 6,323,984 B1 | 11/2001 | Trisnadi | 359/245 |
| 6,327,071 B1 | 12/2001 | Kimura | 359/291 |
| 6,342,960 B1 | 1/2002 | McCullough | 359/124 |
| 6,346,430 B1 | 2/2002 | Raj et al. | |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,418,152 B1 | 7/2002 | Davis | |
| 6,421,179 B1 | 7/2002 | Gutin et al. | 359/572 |
| 6,438,954 B1 | 8/2002 | Goetz et al. | |
| 6,445,502 B1 | 9/2002 | Islam et al. | 359/571 |
| 6,452,260 B1 | 9/2002 | Corbin et al. | 257/686 |
| 6,454,470 B1 * | 9/2002 | Dwarkin et al. | 385/93 |
| 6,466,354 B1 | 10/2002 | Gudeman | 359/247 |
| 6,479,811 B1 | 11/2002 | Kruschwitz et al. | |
| 6,480,634 B1 | 11/2002 | Corrigan | 385/4 |
| 6,497,490 B1 | 12/2002 | Miller et al. | 359/614 |
| 6,525,863 B1 | 2/2003 | Riza | 359/290 |
| 6,563,974 B2 | 5/2003 | Agha Riza | 385/18 |
| 6,565,222 B1 | 5/2003 | Ishii et al. | 359/883 |
| 6,569,717 B1 | 5/2003 | Murade | |
| 6,739,760 B2 * | 5/2004 | Cheng et al. | 385/89 |
| 2001/0019454 A1 | 9/2001 | Tadic-Galeb et al. | 359/649 |
| 2002/0015230 A1 | 2/2002 | Pilossof et al. | 359/558 |
| 2002/0018625 A1 * | 2/2002 | Grann et al. | 385/88 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131230 A1 | 9/2002 | Potter | 361/277 |
| 2002/0135708 A1 | 9/2002 | Murden et al. | |
| 2002/0176151 A1 | 11/2002 | Moon et al. | |
| 2003/0056078 A1 | 3/2003 | Johansson et al. | |
| 2003/0063844 A1 * | 4/2003 | Caracci et al. | 385/24 |

FOREIGN PATENT DOCUMENTS

| | | | |
|---|---|---|---|
| DE | 43 23 799 A1 | 1/1994 | H01L/23/50 |
| DE | 197 51 716 A1 | 5/1997 | |
| DE | 197 23 618 A1 | 12/1997 | G03F/1/14 |
| DE | 198 46 532 C1 | 10/1998 | G02B/27/09 |
| EP | 0 089 044 A2 | 9/1983 | |
| EP | 0 261 901 A2 | 3/1988 | G09G/3/36 |
| EP | 0 304 263 A3 | 2/1989 | |
| EP | 0 306 308 A2 | 3/1989 | H04N/3/14 |
| EP | 0 314 437 A1 | 5/1989 | |
| EP | 0 322 714 A2 | 7/1989 | G02B/5/30 |
| EP | 0 627 644 A3 | 9/1990 | |
| EP | 0 417 039 A1 | 3/1991 | G03B/21/20 |
| EP | 0 423 513 A2 | 4/1991 | H01S/3/085 |
| EP | 0 436 738 A1 | 7/1991 | H04N/5/74 |
| EP | 0 458 316 A2 | 11/1991 | G06K/11/06 |
| EP | 0 477 566 A2 | 4/1992 | G02B/26/08 |
| EP | 0 488 326 A3 | 6/1992 | G09G/3/28 |
| EP | 0 499 566 A2 | 8/1992 | |
| EP | 0 528 646 A1 | 2/1993 | G09G/3/02 |
| EP | 0 530 760 A2 | 3/1993 | G09G/3/34 |
| EP | 0 550 189 A1 | 7/1993 | G02F/1/315 |
| EP | 0 610 665 A1 | 8/1994 | G09G/3/34 |
| EP | 0 627 644 A2 | 12/1994 | G02B/27/00 |
| EP | 0 627 850 A1 | 12/1994 | H04N/5/64 |
| EP | 0 643 314 A2 | 3/1995 | G02B/27/00 |
| EP | 0 654 777 A1 | 5/1995 | G09G/3/34 |
| EP | 0 658 868 A1 | 6/1995 | G09G/3/34 |
| EP | 0 658 830 A1 | 12/1995 | G09G/3/34 |
| EP | 0 689 078 A1 | 12/1995 | G02B/26/08 |
| EP | 0 801 319 A1 | 10/1997 | G02B/26/00 |
| EP | 0 851 492 A2 | 7/1998 | H01L/23/538 |
| EP | 1 003 071 A2 | 5/2000 | G03B/27/72 |
| EP | 1 014 143 A1 | 6/2000 | G02B/26/08 |
| EP | 1 040 927 A2 | 10/2000 | B41J/2/455 |
| GB | 2 117 564 A | 10/1983 | H01L/25/08 |
| GB | 2 118 365 A | 10/1983 | H01L/27/13 |
| GB | 2 266 385 A | 10/1993 | G02B/23/10 |
| GB | 2 296 152 A | 6/1996 | H04N/13/04 |
| GB | 2 319 424 A | 5/1998 | H04N/13/04 |
| JP | 53-39068 | 4/1978 | H01L/23/12 |
| JP | 55-111151 | 8/1980 | H01L/27/00 |
| JP | 57-31166 | 2/1982 | H01L/23/48 |
| JP | 57-210638 | 12/1982 | H01L/21/60 |
| JP | 60-49638 | 3/1985 | H01L/21/60 |
| JP | 60-94756 | 5/1985 | H01L/25/04 |
| JP | 60-250639 | 12/1985 | H01L/21/58 |
| JP | 61-142750 | 6/1986 | H01L/21/60 |
| JP | 61-145838 | 7/1986 | H01L/21/60 |
| JP | 63-234767 | 9/1988 | H04N/1/04 |
| JP | 63-305323 | 12/1988 | G02F/1/13 |
| JP | 1155637 | 6/1989 | |
| JP | 1-155637 | 6/1989 | H01L/21/66 |
| JP | 2219092 | 8/1990 | G09G/3/28 |
| JP | 4-333015 | 11/1992 | G02B/27/18 |
| JP | 7-281161 | 10/1995 | G02F/1/1333 |
| JP | 3288369 | 3/2002 | G02B/26/06 |
| WO | WO 90/13913 | 11/1990 | H01L/23/10 |
| WO | WO 92/12506 | 7/1992 | G09F/9/37 |
| WO | WO 93/02269 | 2/1993 | E06B/5/10 |
| WO | WO 93/09472 | 5/1993 | G03F/7/20 |
| WO | WO 93/18428 | 9/1993 | G02B/27/00 |
| WO | WO 93/22694 | 11/1993 | G02B/5/18 |
| WO | WO 94/09473 | 4/1994 | G09G/3/34 |
| WO | WO 94/29761 | 12/1994 | G02B/27/24 |
| WO | WO 95/11473 | 4/1995 | G02B/27/00 |
| WO | WO 96/02941 | 2/1996 | H01L/23/02 |
| WO | WO 96/08031 | 3/1996 | H01J/29/12 |
| WO | WO 96/41217 | 12/1996 | G02B/5/18 |
| WO | WO 96/41224 | 12/1996 | G02B/19/00 |
| WO | WO 97/22033 | 6/1997 | G02B/27/22 |
| WO | WO 97/26569 | 7/1997 | G02B/5/18 |
| WO | WO 98/05935 | 2/1998 | G01L/9/06 |
| WO | WO 98/24240 | 6/1998 | H04N/9/31 |
| WO | WO 98/41893 | 9/1998 | G02B/26/08 |
| WO | WO 99/07146 | 2/1999 | H04N/7/16 |
| WO | WO 99/12208 | 3/1999 | H01L/25/065 |
| WO | WO 99/23520 | 5/1999 | G02B/26/08 |
| WO | WO 99/34484 | 7/1999 | |
| WO | WO 99/59335 | 11/1999 | H04N/5/765 |
| WO | WO 99/63388 A2 | 12/1999 | |
| WO | WO 99/67671 | 12/1999 | G02B/26/08 |
| WO | WO 00/04718 | 1/2000 | H04N/7/167 |
| WO | WO 00/07225 | 2/2000 | H01L/21/00 |
| WO | WO 01/04674 A1 | 1/2001 | G02B/6/12 |
| WO | WO 01/06297 A2 | 1/2001 | |
| WO | WO 01/57581 A2 | 8/2001 | |
| WO | WO 02/25348 A2 | 3/2002 | |
| WO | WO 02/31575 A2 | 4/2002 | G02B/27/00 |
| WO | WO 02/058111 A2 | 7/2002 | |
| WO | WO 02/065184 A2 | 8/2002 | |
| WO | WO 02/073286 A2 | 9/2002 | G02B/26/08 |
| WO | WO 02/084375 A1 | 10/2002 | G02B/26/08 |
| WO | WO 02/084397 A2 | 10/2002 | |

| WO | WO 03/001281 A1 | 1/2003 | ............. G02F/1/01 |
| WO | WO 03/001716 A1 | 1/2003 | ............. H04J/14/02 |
| WO | WO 03/012523 A1 | 2/2003 | ............ G02B/26/00 |
| WO | WO 03/016965 A1 | 2/2003 | ............. G02B/5/18 |
| WO | WO 03/023849 A1 | 3/2003 | ............ H01L/23/02 |
| WO | WO 03/025628 A2 | 3/2003 | |

OTHER PUBLICATIONS

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays," Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7th International Conference on Solid–State Sensors and Actuators.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology." Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings,* Sensors and Actuators A, pp. 7–15, 1998.

R.N. Thomas, et al., "The Mirror–Matrix Tube: A Novel Light Valve for Projection Displays," IEEE Transactions on Electron Devices, vol. ED–22, No. 9, pp. 765–775, Sep. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997, pp. 377–379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995–1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum —Tunable Laser, Aug. 2000, pp. 58–62.

Elizabeth Bruce, "Tunable Lasers", Communications, IEEE Spectrum, Feb. 2002, pp. 35–39.

M. G. Littman et al., "Spectrally Narrow Pulsed Dry Laser without Beam Expander", Applied Optics, vol. 17, No. 14, Jul. 15, 1978, pp. 2224–2227.

Apte et al., "Deformable Grating Light Valves for High Resolution Displays," Solid State Actuator Workshop, Hilton Head, South Carolina, Jun. 13–16, 1994.

Sene et al., "Polysilicon micromechnical gratings for optical modulaton," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems" Electronic Systems, NASA Tech Briefs, Mar. 1997, pp. 50 & 52.

S.T. Pai, et al., "Electromigration in Metals", Received Jun. 4, 1976, pp. 103–115.

Olga B. Spahn, et al., "High Optical Power Handling of Pop–Up Microelectromechanical Mirrors", Sandia National Laboratories, IEEE 2000, pp. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminum Mirror," Physical Electronics Laboratory, 1991 IEEE, pp. 547–550.

M. Parameswaran et al., "Commerical CMOS Fabricated Integrated Dynamic Thermal Scence Simulator," 1991 IEEE, pp. 29.4.1–29.4.4.

M. Parameswaran et al., "CMOS Electrothermal Microactuators," Depart. of Electrical Engineering, 1990, IEEE, pp. 128–131.

U. Streller et al., "Selectivity in dry etching of Si(100) with XeF2 and VUV light," Applied Surface Science 106, (1996), pp. 341–346.

M.J.M. Vurgts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A, 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, p. 2–5.

W. Riethmuller et al., "A smart accelerometer with on–chip electronics fabricated by a commerical CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching," Solid State Technology, V. 26, #4, Apr. 1983, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 61 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID '99, San Jose, CA, 27 pgs., 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators", Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Mircomirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications," IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in Al/$Si_3N_4$ Micro–Ribbon", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

US 6,956,995 B1

OPTICAL COMMUNICATION ARRANGEMENT

RELATED APPLICATIONS

This application claims priority from U.S. Provisional Patent Application No. 60/345,335, filed on Nov. 9, 2001, which is incorporated by reference.

FIELD OF THE INVENTION

This invention relates to the field of optical communication. More particularly, this invention relates to the field of optical communication where there is a need to couple an optical fiber to an opto-electronic element.

BACKGROUND OF THE INVENTION

Optical communication uses optical fibers to carry information in the form of optical signals between a light source and a light receiver. A typical light source used for the optical communication is a Vertical Cavity Surface Emitting Laser (VCSEL). A type of light receiver used for the optical communication is a photodiode. Both the VCSEL and the photodiode are commonly arranged with their optical axes aligned perpendicular to an opto-electronic substrate which holds the VCSEL and the photodiode.

Examining a single optical communication link shows a first opto-electronic board, the VCSEL, an optical fiber, the photodiode, and a second opto-electronic board. The VCSEL is attached to the first opto-electronic board. The photodiode is attached to the second opto-electronic board. The optical fiber optically couples the VCSEL to the photodiode. If the optical fiber is directly coupled to the VCSEL and to the photodiode, the optical fiber must be arranged with a first end perpendicular to the first opto-electronic board and it must also be arranged with a second end perpendicular to the second opto-electronic board.

A method for bringing an optical fiber to the VCSEL or photodiode parallel to an opto-electronic board which holds the VCSEL or the photodiode uses an optical coupler having a silicon v-groove bench in which a fiber stub is placed. The fiber stub optically couples the optical fiber to the VCSEL or the photodiode. A first end of the fiber stub has a flat surface which optically couples to the optical fiber. A second end of the fiber stub has a facet cleaved at 45° which is metallized. The metallized facet reflects an optical signal either from the VCSEL to the optical fiber or from the optical fiber to the photodiode.

The method also applies where multiple optical fibers are coupled to multiple VCSELs and multiple photodiodes on an opto-electronic board. In this case, the silicon v-groove bench contains multiple v-grooves for holding multiple fiber stubs.

The optical coupler made of the silicon v-groove bench and either a fiber stub or multiple fiber stubs requires numerous processing steps and multiple components. Consequently, the optical coupler is relatively expensive.

What is needed is an optical coupler which requires fewer parts and which is more economical.

What is needed is an optical communication arrangement which employs an optical coupler having fewer parts and which employs an optical coupler that is more economical.

SUMMARY OF THE INVENTION

The present invention is an arrangement for optical communication. The arrangement comprises an optical coupler, an opto-electronic board, and an optical fiber. The optical coupler comprises a first refraction surface, a second refraction surface, and an internal reflector. The first refraction surface has a first finite focal length. The second refraction surface has a second finite focal length. In operation, an optical signal enters the first refraction surface, couples from the first refraction surface to the second refraction surface via the internal reflector, and exits the second refraction surface, where the optical signal defines a light path. The light path optically couples the opto-electronic board to the optical fiber.

DETAILED DESCRIPTION OF THE EMBODIMENTS

The preferred optical coupler of the present invention includes alignment features. Preferably, the alignment features provide optical alignment of the preferred optical coupler to an array of optical fibers and also provide optical alignment of the preferred optical coupler to light emitting and light receiving components on an opto-electronic board. Alternatively, the alignment features provide alignment to other optical sources or other optical receivers. In order to more simply introduce aspects of the present invention, first through fourth alternative optical couplers of the present invention are discussed before more fully describing the preferred optical coupler.

Figure 1:
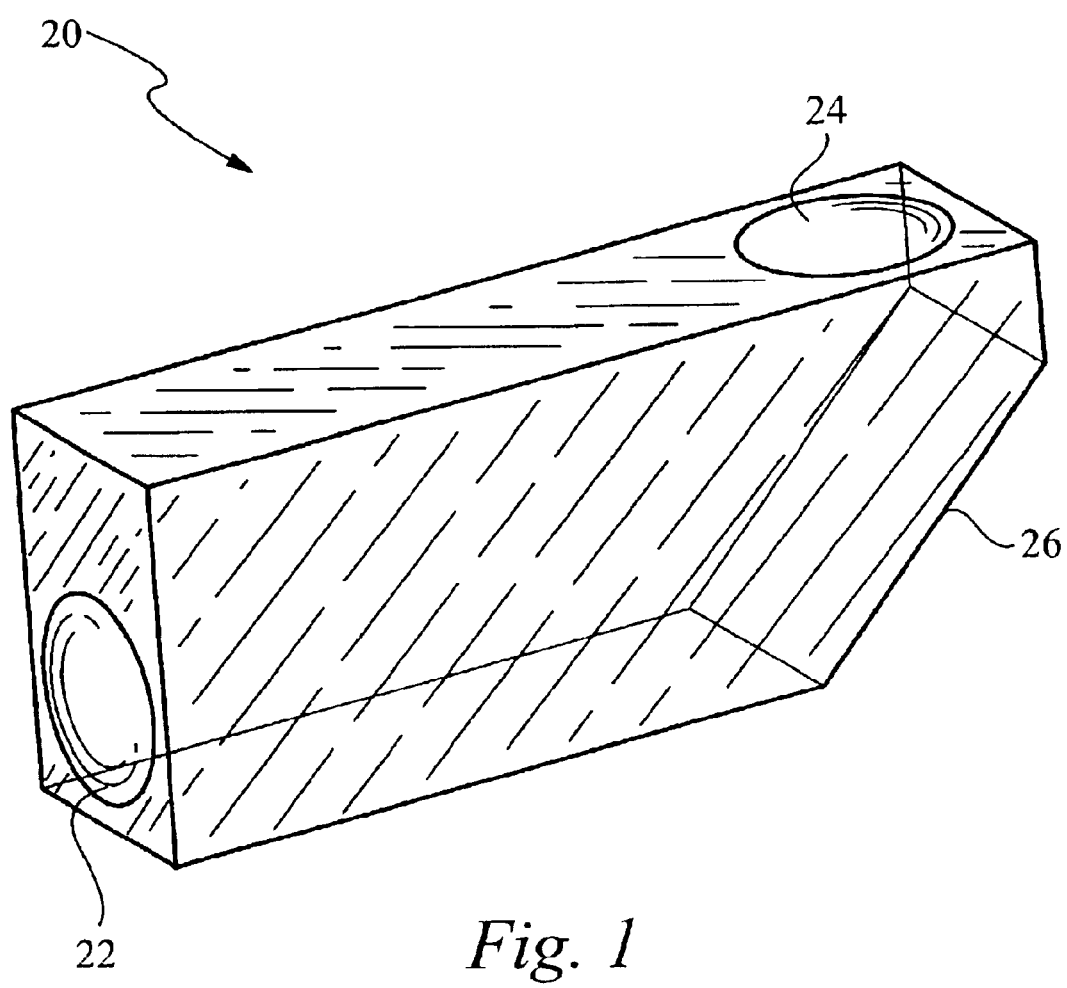
FIG. 1 illustrates a first alternative optical coupler of the present invention.

The first alternative optical coupler of the present invention is illustrated isometrically in FIG. 1. The first alternative optical coupler 20 comprises an optically transmissive material, first and second refraction surfaces, 22 and 24, and a first total internal reflection surface 26.

It will be readily apparent to one skilled in the art that the first total internal reflection surface 26 is a reflector employing a well known optical phenomena called "total internal reflection." The phenomena of total internal reflection occurs when first and second conditions are met. The first condition is that light traveling within a first media having a first index of refraction encounters a surface bounding a second media having a second index of refraction that is less than the first index of refraction. The second condition is that an incidence angle for the light encountering the surface exceeds a critical angle.

Figure 2:
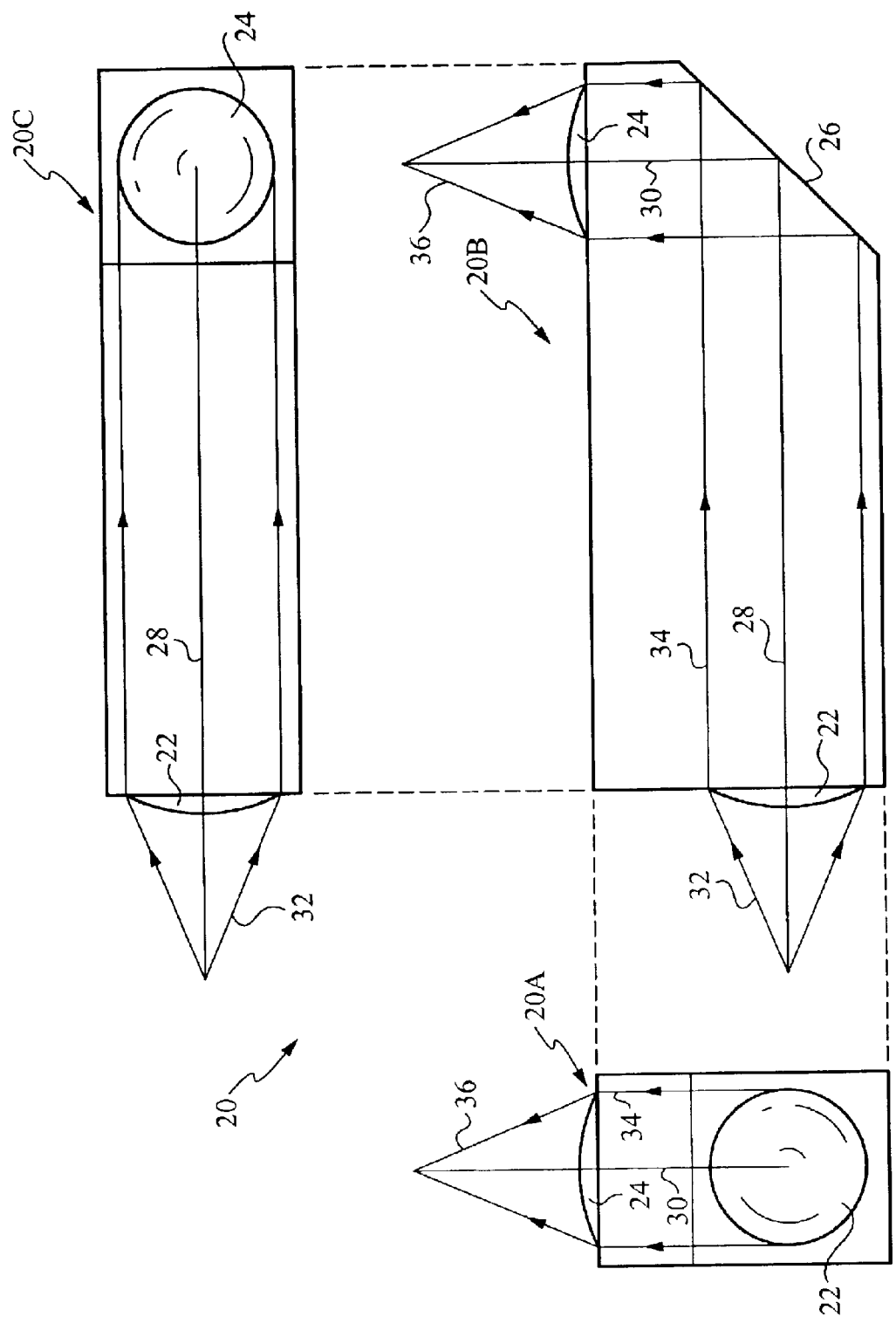
FIG. 2 further illustrates the first alternative optical coupler of the present invention.

The first alternative optical coupler 20 is further illustrated in FIG. 2, which shows front, side, and top views, 20A, 20B, and 20C, of the first alternative optical coupler 20. The first refraction surface 22 has a first finite focal length and defines a first optical axis 28. The second refraction surface 24 has a second finite focal length and defines a second optical axis 30. The first and second optical axes, 28 and 30, form a folded optical axis.

In operation, a divergent optical signal 32 couples to the first refraction surface 22, which collimates the divergent optical signal 32 thereby forming a collimated optical signal 34. The total internal reflection surface 26 reflects the collimated optical signal 34 to the second refraction surface 24, which focuses the collimated optical signal 34 thereby forming a focused optical signal 36.

It will be readily apparent to one skilled in the art that, although the first alternative optical coupler 20 is depicted in FIG. 2 as having the first optical axis 28 oriented at 90° to the second optical axis 30, any angle which is at least twice a critical angle will suffice.

Figure 3:
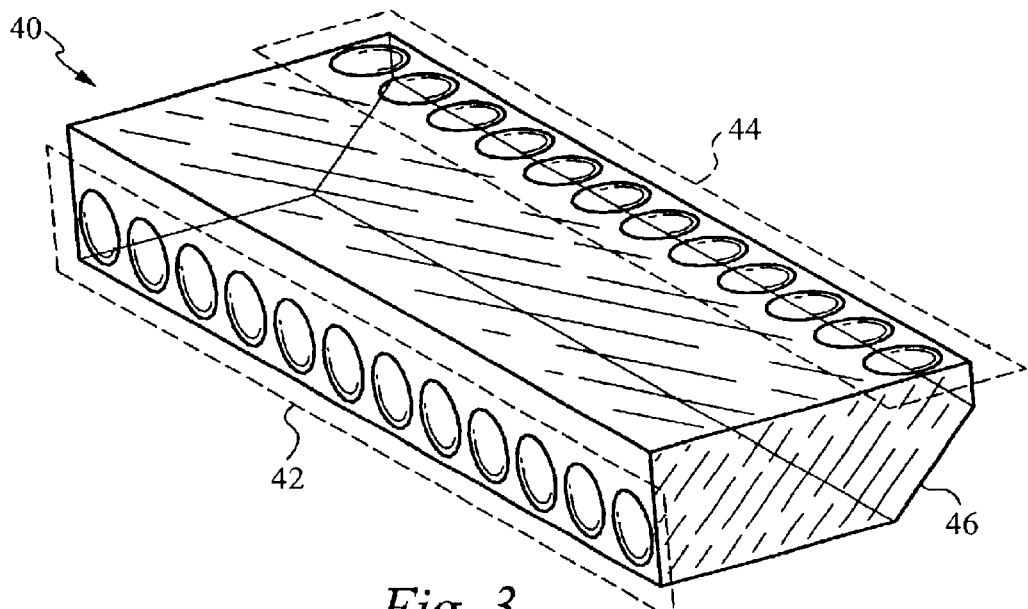
FIG. 3 illustrates a second alternative optical coupler of the present invention.

The second alternative optical coupler of the present invention is illustrated isometrically in FIG. 3. The second alternative optical coupler 40 comprises a first plurality of refraction surfaces 42, a second plurality of refraction surfaces 44, and a second total internal reflection surface 46. Each of the first plurality of refraction surfaces 42 has a third finite focal length and defines a third optical axis. Each of the second plurality of refraction surfaces 44 has a fourth finite focal length and defines a fourth optical axis. The third and fourth optical axes intersect at the second total internal reflection surface 46. Each of the first and second pluralities of refraction surface, 42 and 44, comprises twelve refraction surfaces. Thus, the second alternative optical coupler 40 provides twelve light paths for twelve optical signals.

Preferably, the third finite focal lengths are proximately equal. Alternatively, the third finite focal lengths are not equal. Preferably, the fourth finite focal lengths are proximately equal. Alternatively, the fourth finite focal lengths are not equal.

Figure 4:
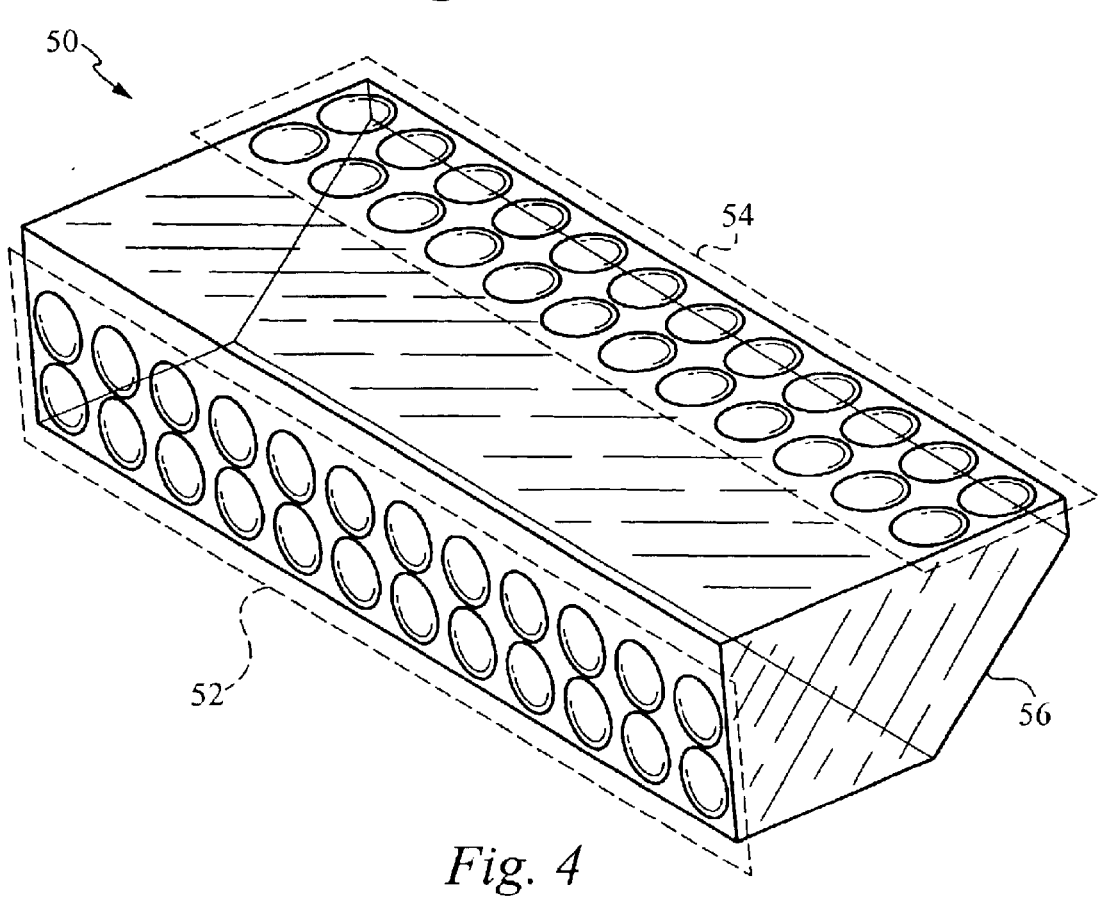
FIG. 4 illustrates a third alternative optical coupler of the present invention.

The third alternative optical coupler of the present invention is illustrated isometrically in FIG. 4. The third alternative optical coupler 50 comprises a third plurality of refraction surfaces 52, a fourth plurality of refraction surfaces 54, and a third total internal reflection 56. Each of the third plurality of refraction surfaces 52 has a fifth finite focal length and defines a fifth optical axis. Each of the fourth plurality of refraction surfaces 54 has a sixth finite focal length and defines a sixth optical axis. The fifth and sixth optical axes intersect at the third total internal reflection surface 56. Each of the third and fourth pluralities of refraction surface, 52 and 54, comprises twenty-four refraction surfaces. Thus, the third alternative optical coupler 50 provides twenty-four light paths for twenty-four optical signals.

Figure 5A:
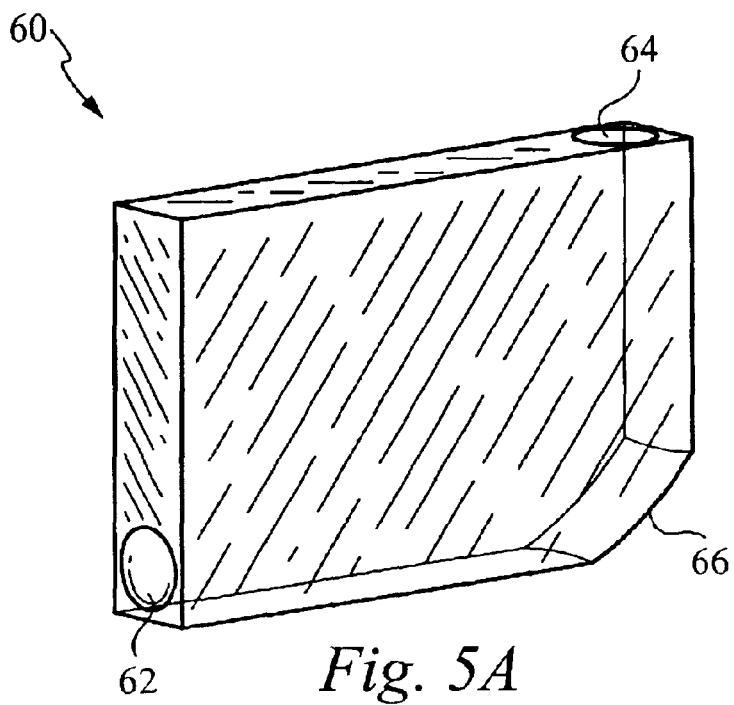
FIGS. 5A and 5B illustrate a fourth alternative optical coupler of the present invention.
Figure 5B:
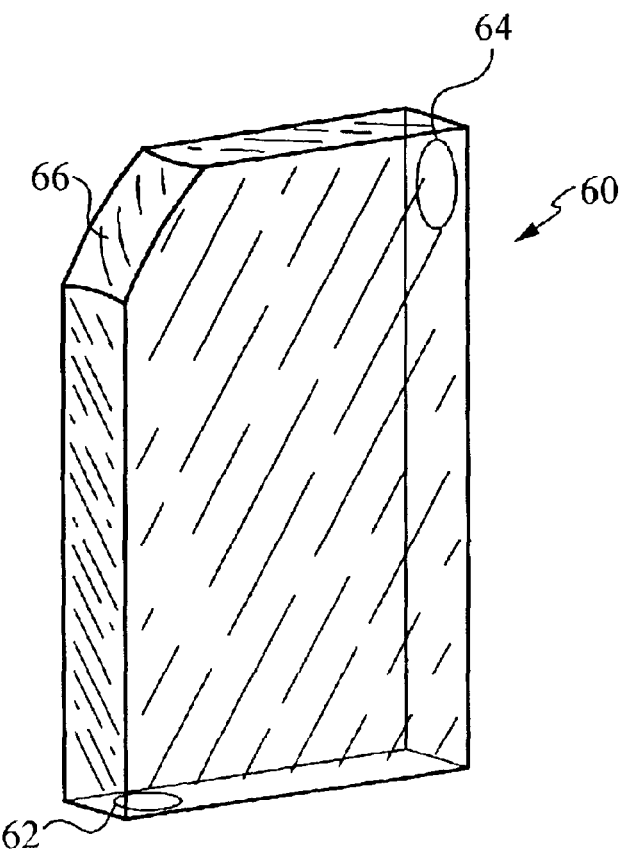

The fourth alternative optical coupler of the present invention is illustrated isometrically in FIGS. 5A and 5B. The fourth alternative optical coupler 60 comprises third and fourth refraction surfaces, 62 and 64, and a fourth total internal reflection surface 66. In the fourth alternative optical coupler, the third and fourth refraction surfaces, 62 and 64, are each separated by a relatively long distance from the fourth total internal reflection surface 66. In order to account for this distance, the fourth total internal reflection surface 66 has a toroidal shape so that the fourth total internal reflection surface 66 acts as a field mirror. The field mirror is analogous to a field lens in a typical optical system. In operation, a second collimated optical signal traveling from the third refraction surface 62 to the total internal reflection surface 66 exhibits a slight divergence. The fourth total internal reflection surface 66, acting as the field mirror, introduces a slight convergence to the second optical signal so that the second optical signal exits the fourth refraction surface 64.

Figure 6A:
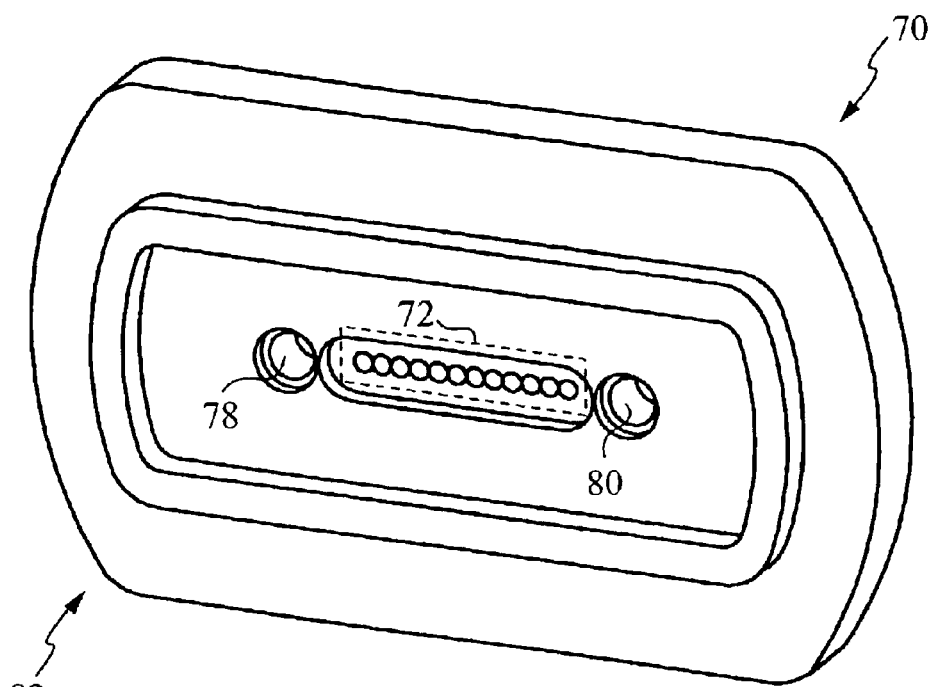
FIGS. 6A and 6B illustrate the preferred optical coupler of the present invention.
Figure 6B:
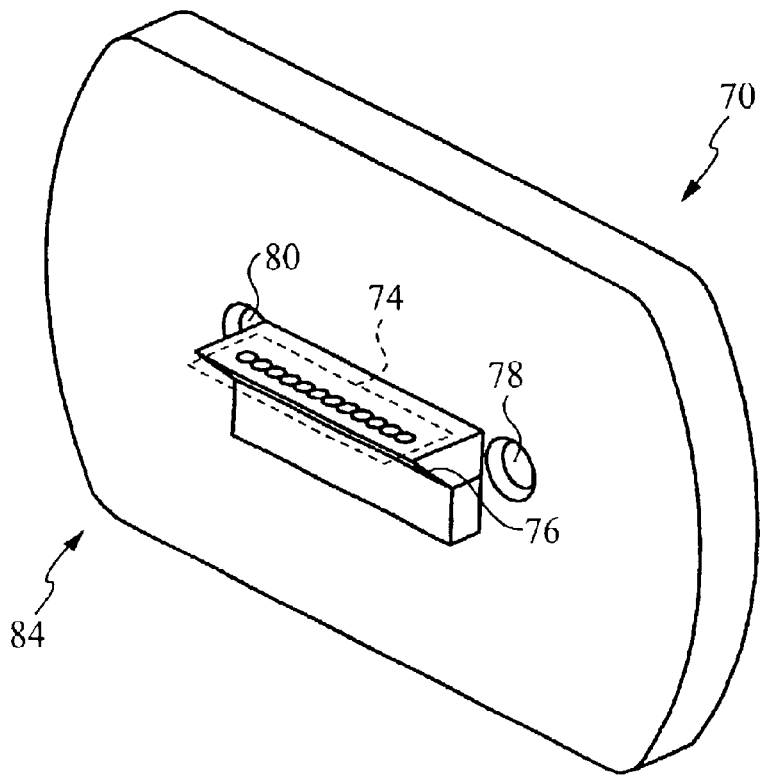

The preferred optical coupler of the present invention is illustrated isometrically in FIGS. 6A and 6B. The preferred optical coupler 70 comprises a fifth plurality of refraction surfaces 72, a sixth plurality of refraction surfaces 74, a fifth total internal reflection surface 76, and first and second alignment holes, 78 and 80. FIG. 6A shows an optical fiber side 82 of the preferred optical coupler 70. FIG. 6B shows an opto-electronic board side 84 of the preferred optical coupler 70.

Figure 7A:
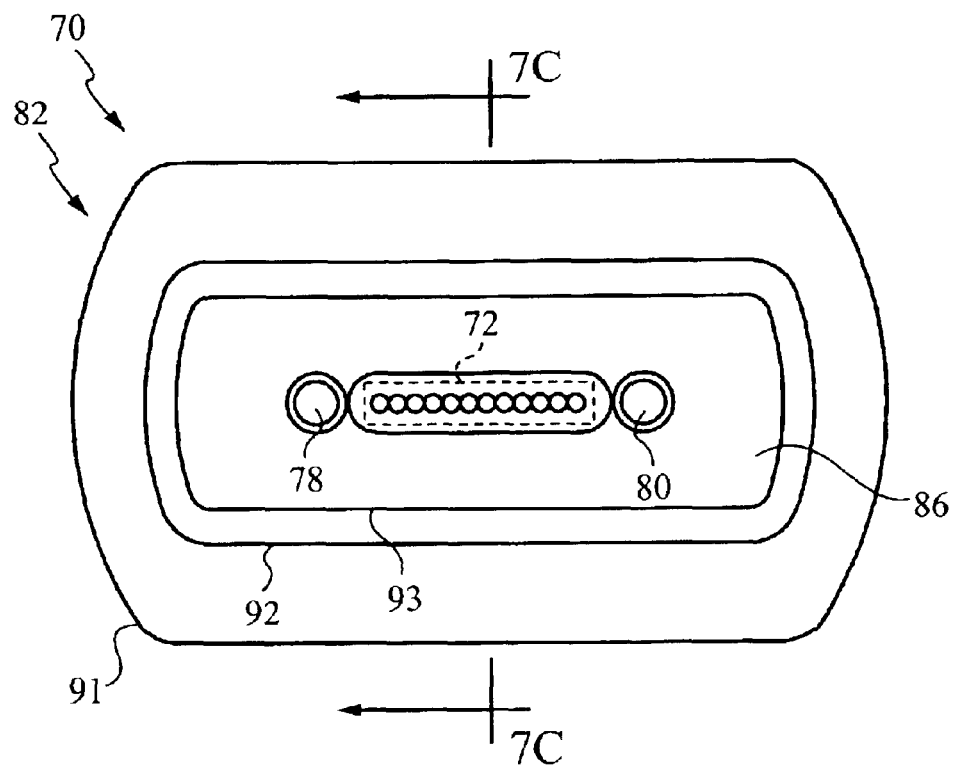
FIGS. 7A through 7C further illustrate the preferred optical coupler of the present invention.
Figure 7B:
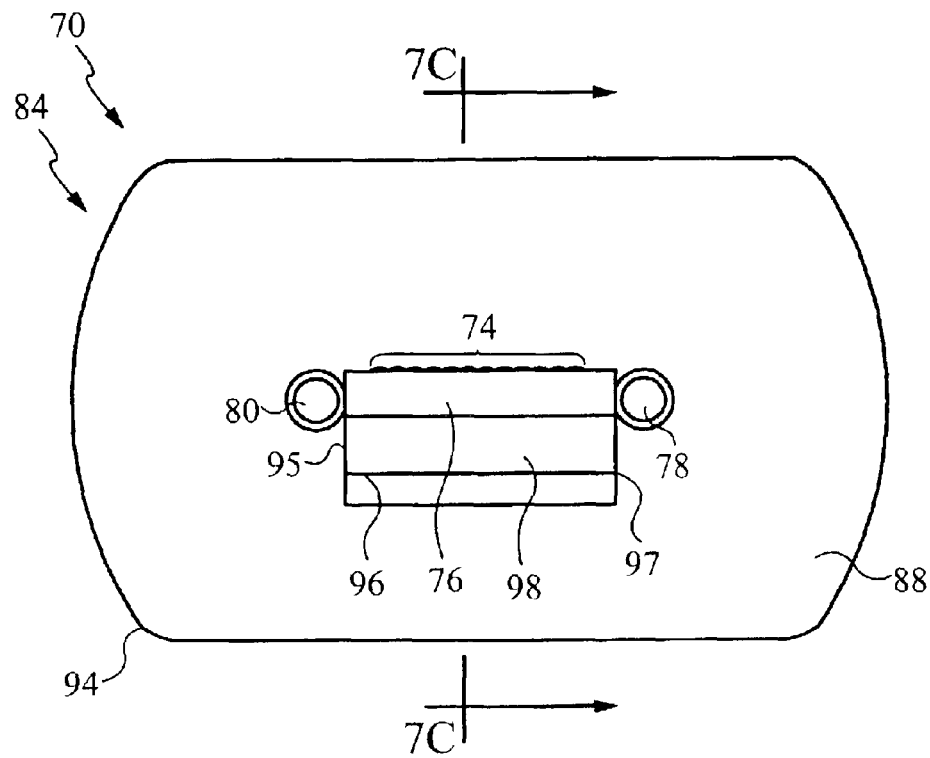

The optical fiber side 82 and the opto-electronic board side 84 of the preferred optical coupler 70 are further illustrated in FIGS. 7A and 7B, respectively. The optical fiber side 82 of the preferred optical coupler 70 further comprises a first mating surface 86. In use, the first mating surface 86 mates with a ferrule of an optical fiber connector assembly. The opto-electronic board side 84 of the preferred optical coupler 70 further comprises a second mating surface 88. In use, the second mating surface 88 preferably mates with a heatsink, which holds the opto-electronic board. Alternatively, the second mating surface 88 couples to the heatsink through one or more intermediate components.

Preferably, the alignment features of the preferred optical coupler 70 comprise the first and second alignment holes, 78 and 80, the first and second mating surfaces, 86 and 88. Alternatively, the alignment features comprise position and rotation alignment features which align the preferred optical coupler 70 to the array of optical fibers and which align the preferred optical coupler 70 to the light emitting and light receiving components on the opto-electronic board.

Preferably, the preferred optical coupler is fabricated in a molding process. Preferably, the preferred optical coupler 70 includes fabrication enhancement features which promote a repeatable molding process. Preferably, the fabrication enhancement features include counterboring the first and second alignment holes, 78 and 80, on the optical fiber side 82 of the preferred optical coupler 70. Preferably, the fabrication enhancement features also include countersinking the first and second alignment holes, 78 and 80, on the opto-electronic side 84 of the preferred optical coupler 70. Alternatively, the first and second alignment holes, 78 and 80, are counter sunk on the optical fiber side 82 of the preferred optical coupler 70 and counterbored on the opto-electronic side 84 of the preferred optical coupler 70.

Preferably, the fabrication enhancement features further include rounding first through seventh edges, 91–97. Preferably, the fabrication enhancement features also include a protrusion 98 adjacent to the fifth total internal reflection surface 76. Alternatively, the preferred optical coupler 70 does not include the fabrication enhancement features.

Figure 7C:
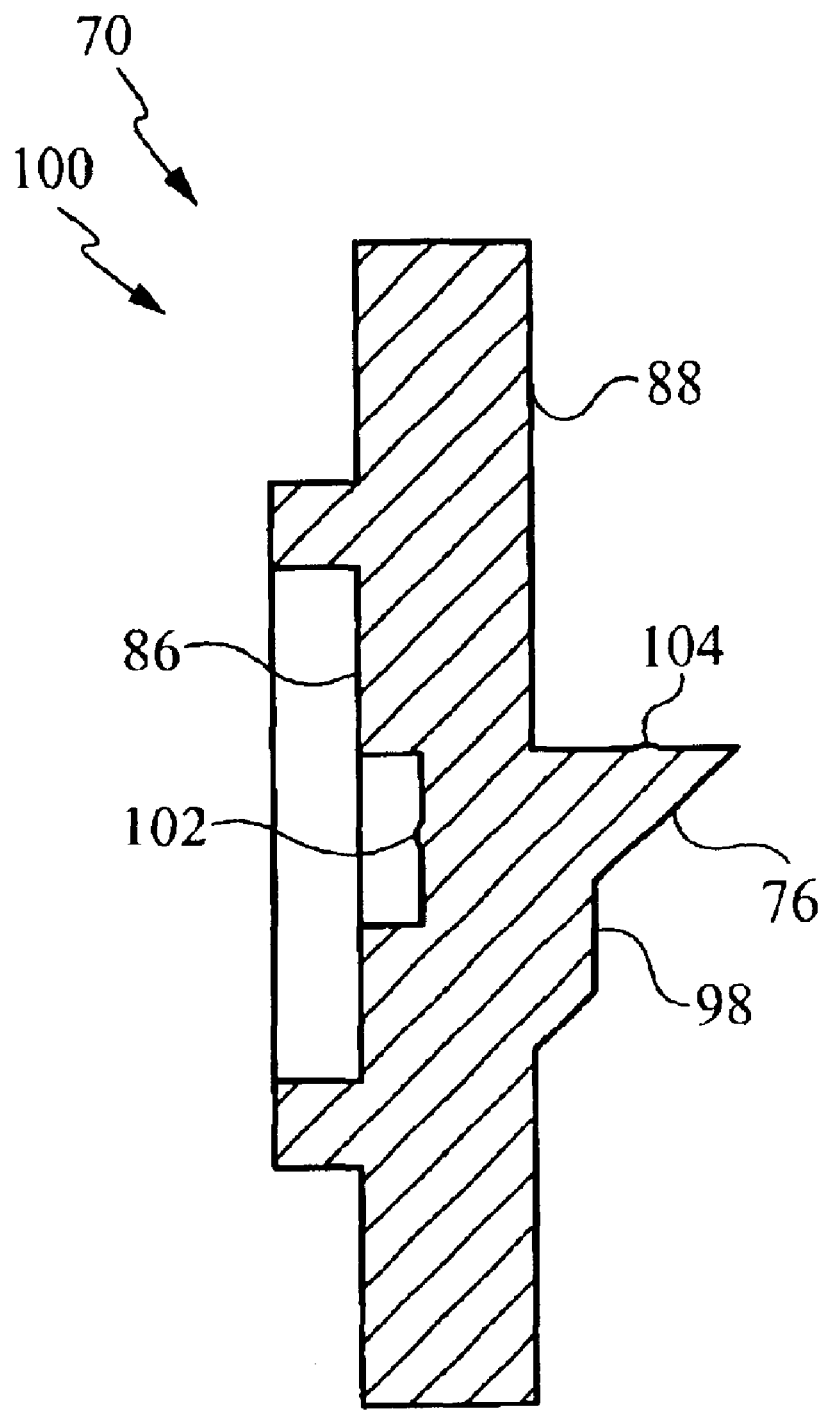

A first cross-section of the preferred optical coupler 70 is illustrated in FIG. 7C. The first cross-section 100 of the preferred optical coupler 70 shows a seventh refraction surface 102 which is one of the fifth plurality of refraction surfaces 72, an eighth refraction surface 104 which is one of the sixth plurality of refraction surfaces 74, the fifth total internal reflection surface 76, the first and second mating surfaces, 86 and 88, and the protrusion 98 adjacent to the fifth total internal reflection surface 76.

Preferably, in operations the preferred optical coupler operates in a first mode. Alternatively, in operation, the preferred optical coupler operates in a second mode. In the first mode, a second divergent optical signal exits an optical fiber, enters and is collimated by the seventh refraction surface 102, reflects from the fifth total internal reflection surface 76, and is focused by eighth refraction surface 104 onto a photo-diode on the opto-electronic board. In the second mode, a third divergent optical signal exits a VCSEL (vertical cavity surface emitting laser) on the optoelectronic board, enters and is collimated by the eighth refraction surface 104, reflects from the fifth total internal reflection surface 76, is focused by the seventh refraction surface 102 onto a core of the optical fiber, and couples into the core of the optical fiber.

Preferably, the preferred optical coupler 70 operates at an 850 nm wavelength band. Alternatively, the preferred optical coupler 70 operates at another wavelength band.

Figure 8A:
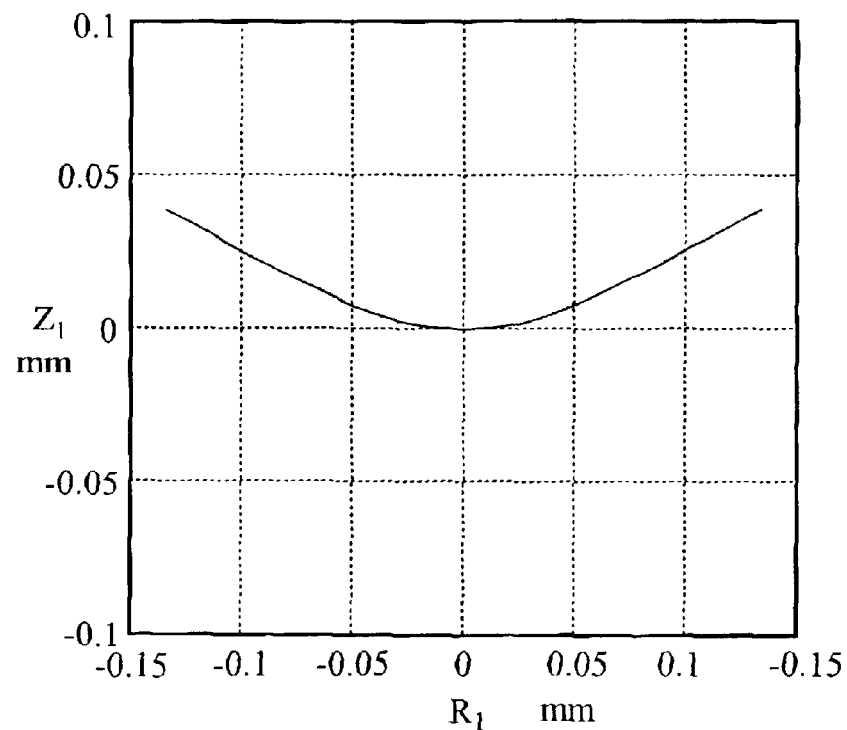
FIGS. 8A and 8B graphically illustrate first and second sags for refraction surfaces of the preferred optical coupler of the present invention.

Preferably, the seventh refraction surface 102 is a first aspherical lens surface. More preferably, the seventh refraction surface is a second aspherical lens surface illustrated graphically in FIG. 8A. The second aspherical surface comprises a first radius $R_1$ and a first sag $Z_1$. Mathematically, the first sag $Z_1$ as a function of the first radius $R_1$ is given by: $Z_1 = 6.21319 \, (R_1)^2 / \{1 + [1 - 184.5719 \, (R_1)^2]^{1/2}\}$. Alternatively, the seventh refraction surface 102 is a first spherical lens surface appropriately adjusted for desired focal lengths.

Figure 8B:
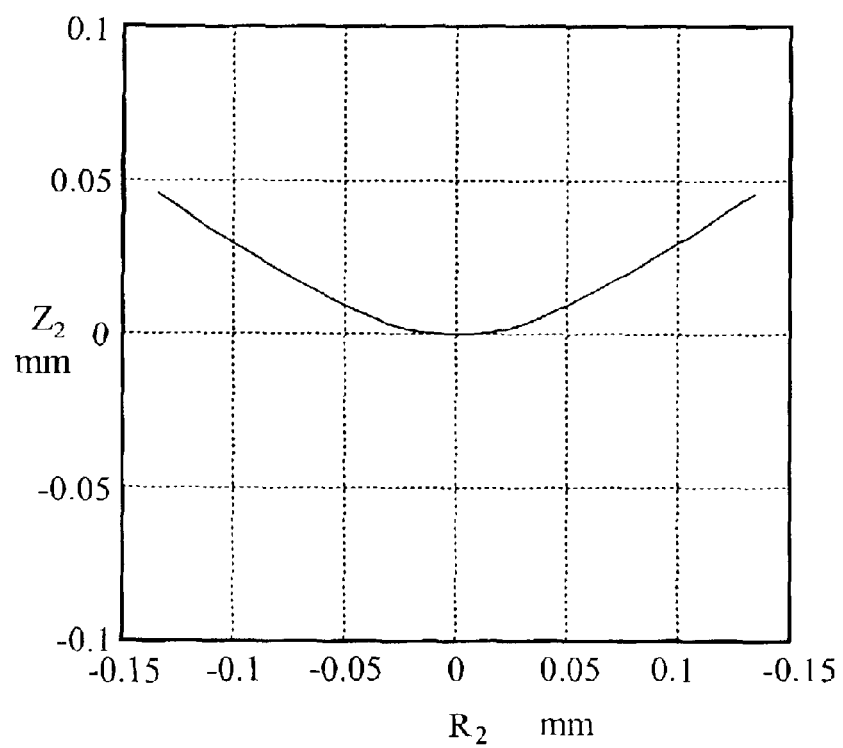

Preferably, the eighth refraction surface 104 is a third aspherical lens surface. More preferably, the eighth refraction surface 104 is a fourth aspherical lens surface illustrated graphically in FIG. 8B. The fourth aspherical surface comprises a second radius $R_2$ and a second sag $Z_2$. Mathematically, the second sag $Z_2$ as a function of the second radius $R_2$ is given by $Z_2 = 7.07774(R_2)^2 / \{1 + [1 - 91.1807 \, (R_2)^2]^{1/2}\}$. Alternatively, the eighth refraction surface 104 is a second spherical lens surface appropriately adjusted for desired focal lengths.

Figure 9A:
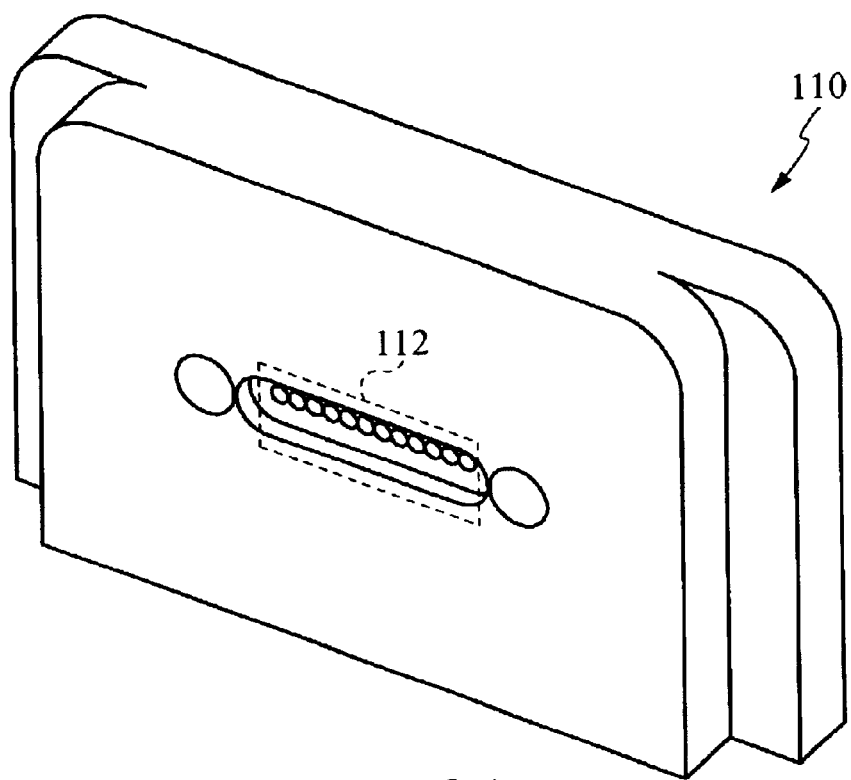
FIGS. 9A and 9B illustrate a fifth alternative coupler of the present invention.
Figure 9B:
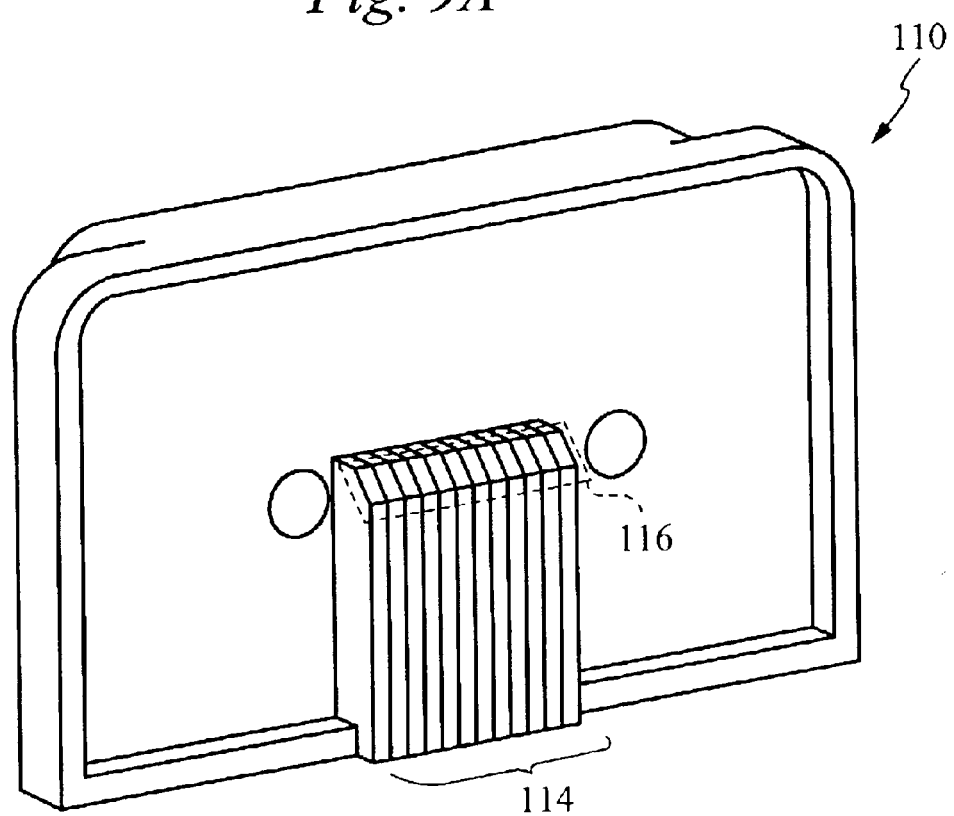

A fifth alternative optical coupler of the present invention is illustrated isometrically in FIGS. 9A and 9B. The fifth alternative optical coupler 110 comprises a seventh plurality of refraction surfaces 112, an eighth plurality of refraction surfaces 114, and a sixth total internal reflection surface 116. To account for a relatively long distance between the seventh and eighth refraction surfaces, 112 and 114, the sixth total internal reflection surface 116 is divided into a plurality of toroidal surfaces so that each acts a second field mirror.

A sixth alternative optical coupler of the present invention replaces the total internal reflection surface 26 of the first alternative optical coupler 20 with an internal reflector. The internal reflector is selected from the group comprising the total internal reflection surface 26, a metal reflector, and a multilayer dielectric reflector.

A seventh alternative optical coupler of the present invention replaces the first and second refraction surfaces, 22 and 24, of the first alternative optical coupler 20 with ninth and tenth refraction surfaces, respectively. In operation, the ninth refraction surface relays the first optical signal through an intermediate focal point to the tenth refraction surface via the total internal reflection surface 26 and the tenth refraction surface focuses the first optical signal. In the seventh optical coupler, the first optical signal reflects from the total internal reflection surface through a range of angles. Because of the reflection through the range of angles and depending on an index of refraction for the seventh alternative optical coupler, the seventh optical coupler could require an angle of incidence on the total internal reflection surface 26 of greater than 45°.

The preferred method of fabricating the preferred optical coupler 70 of the present invention is a precision molding process. The precision molding process comprises first through seventh process steps employing a precision molding apparatus.

Figure 10:
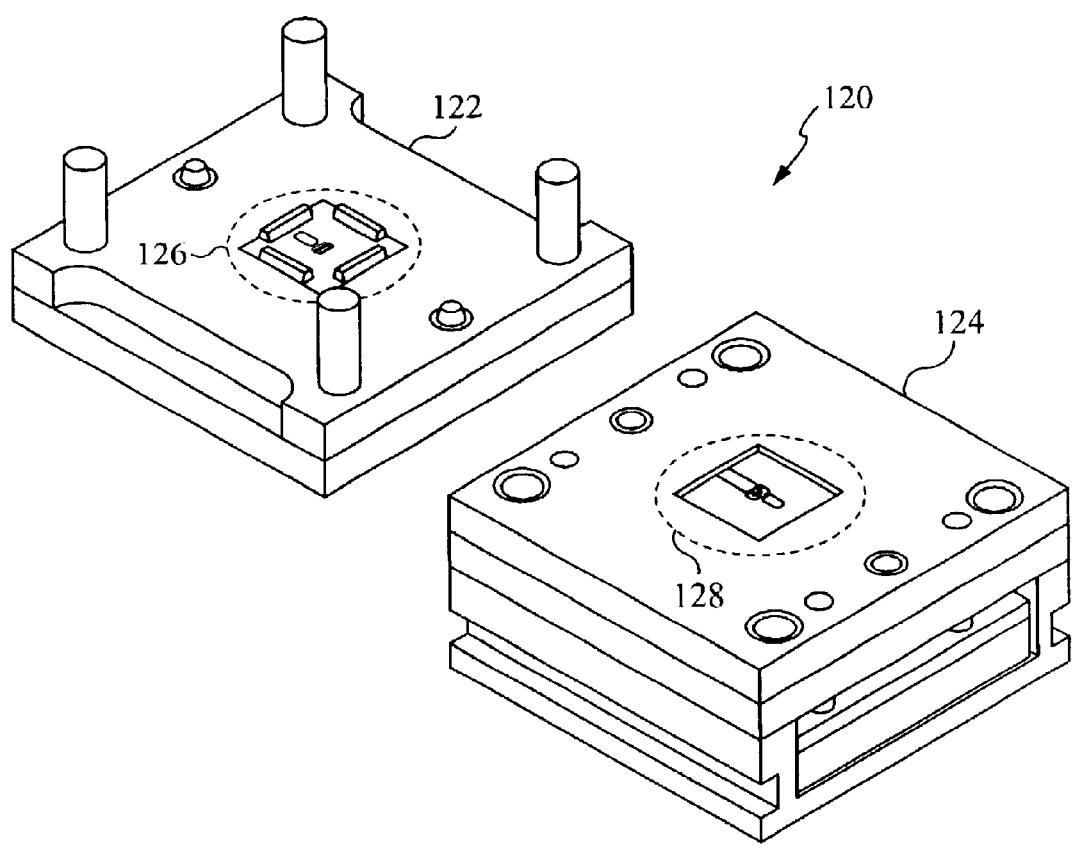
FIG. 10 illustrates a precision molding apparatus of the present invention.

The precision molding apparatus of the present invention is illustrated isometrically in FIG. 10. The precision molding apparatus 120 comprises an upper mold body 122 and a lower mold body 124. The upper mold body 122 comprises an upper mold surface 126. The lower mold body 124 comprises a lower mold surface 128.

Figure 11A:
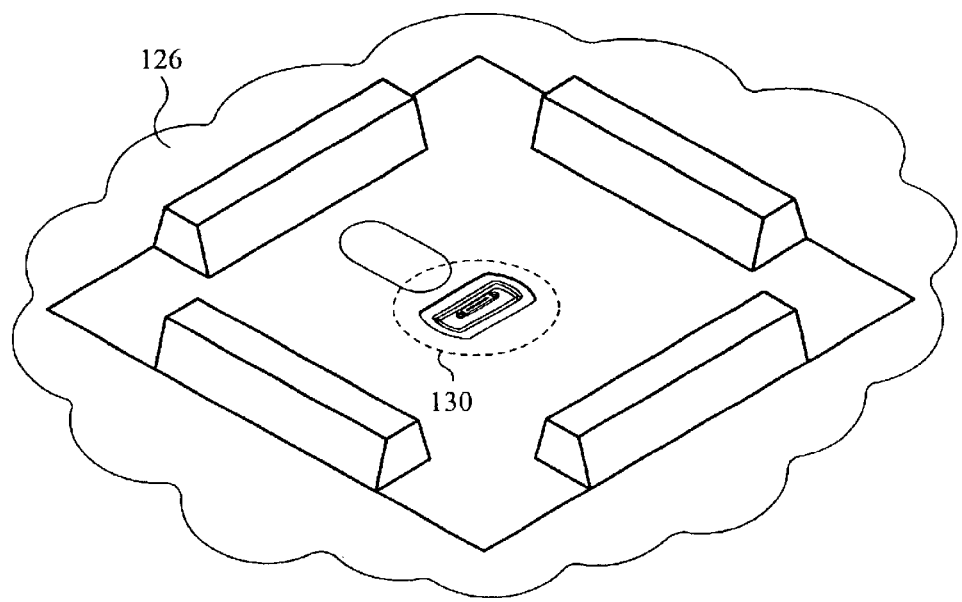
FIGS. 11A and 11B illustrate an upper mold surface of the present invention.
Figure 11B:
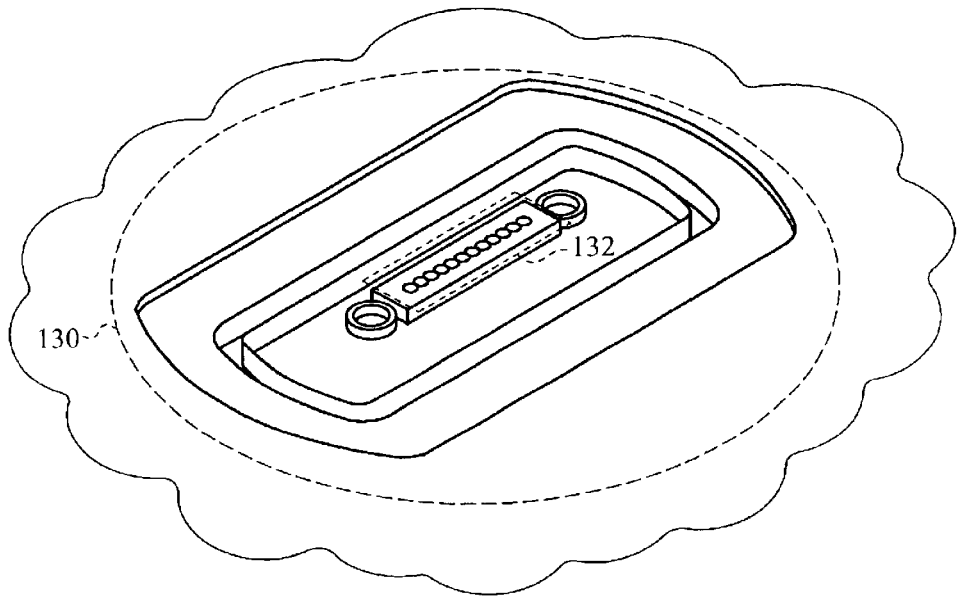

The upper mold surface 126 is further illustrated in FIGS. 11A and 11B. The upper mold surface 126 comprises a first inverse 130 of the optical fiber side 82 of the preferred optical coupler 70. The first inverse 130 includes a first lens array molding surface 132.

Figure 12A:
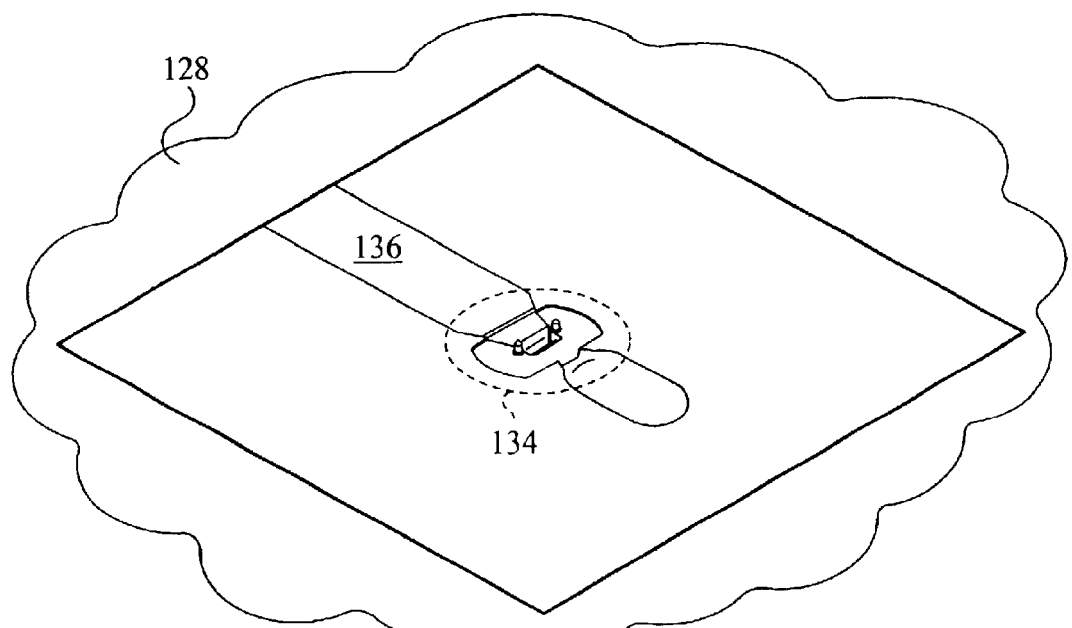
FIGS. 12A and 12B illustrate a lower mold surface of the present invention.
Figure 12B:
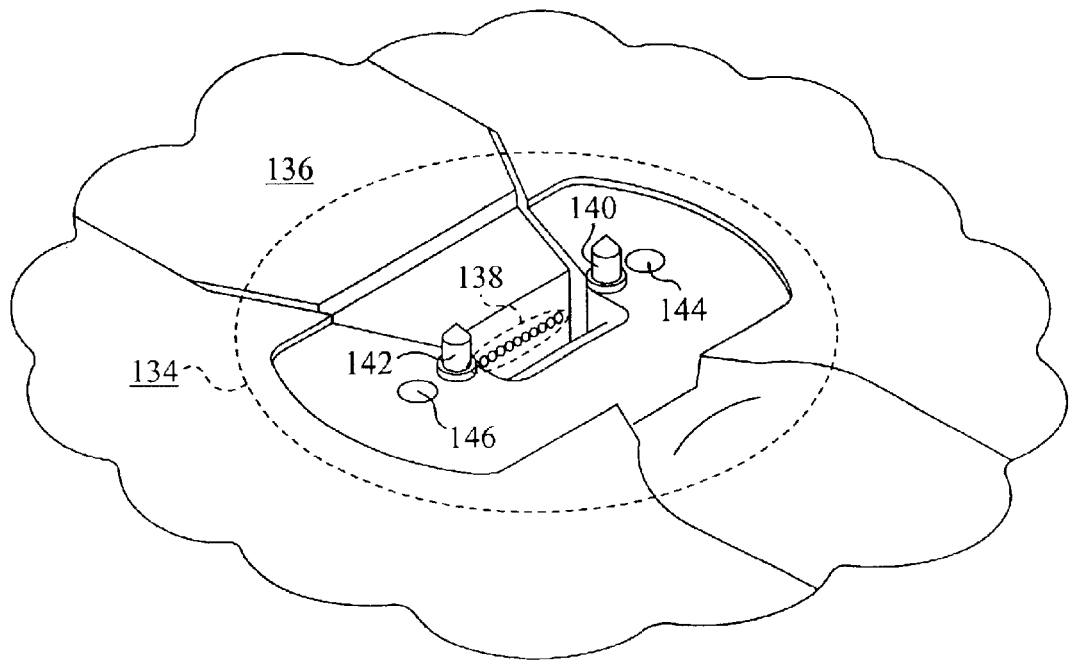

The lower mold surface 128 is further illustrated in FIGS. 12A and 12B. The lower mold surface 128 comprises a second inverse 134 of the opto-electronic board side 84 of the preferred optical coupler 70. Preferably, a portion of the second inverse 134 is part of a slider 136. Preferably, the slider 136 includes a second lens array molding surface 138. Preferably, the lower mold surface 128 includes first and second shafts, 140 and 142, which form the first and second alignment holes, 78 and 80, of the preferred optical coupler 70. Preferably, the lower mold surface includes first and second ejector pins, 144 and 146.

The first step of the precision molding process of the present invention mates the upper and lower mold bodies, 122 and 124, to form a mold cavity. The mold cavity comprises the first and second inverses, 130 and 134, of the preferred optical coupler 70. The second step of the precision molding process fills the mold cavity with melted material. Preferably, the melted material comprises a high temperature plastic. More preferably, the melted material comprises ULTEM ® 1010 (ULTEM is a registered trademark of General Electric Co.). Alternatively, the melted material is selected from the group comprising a plastic and a glass. Further alternatively, the melted material comprises some other refractive material.

The third process step of the precision molding process allows the melted material to cool and, thus, forms a solid refractive material. The fourth process step of the precision molding process slides the slider 136 away from the sixth plurality of refraction surfaces 74 of the preferred optical coupler.

The fifth process step of the precision molding process separates the upper and lower mold bodies, 122 and 124, allowing removal of the preferred optical coupler 70. In the sixth process step of the precision molding process, the first and second ejector pins eject the preferred optical coupler 70 from the lower mold body 124. The seventh process step of the precision molding process trims excess material from the preferred optical coupler 70.

In a first alternative molding process of the present invention, the fifth and sixth pluralities of refraction surfaces, 72 and 74, of the preferred optical coupler 70 are molded while the fifth total internal reflection surface 76 is machined. In a second alternative molding process of the present invention, the preferred optical coupler 70 is machined rather than molded.

The preferred optical communication arrangement of the present invention uses the preferred optical coupler 70 in conjunction with the opto-electronic board, the heatsink, and a fiber cable assembly. In order to more simply introduce aspects of the preferred optical communication arrangement, first and second alternative optical communication arrangements are discussed before more fully describing the preferred optical communication arrangement.

Figure 13:
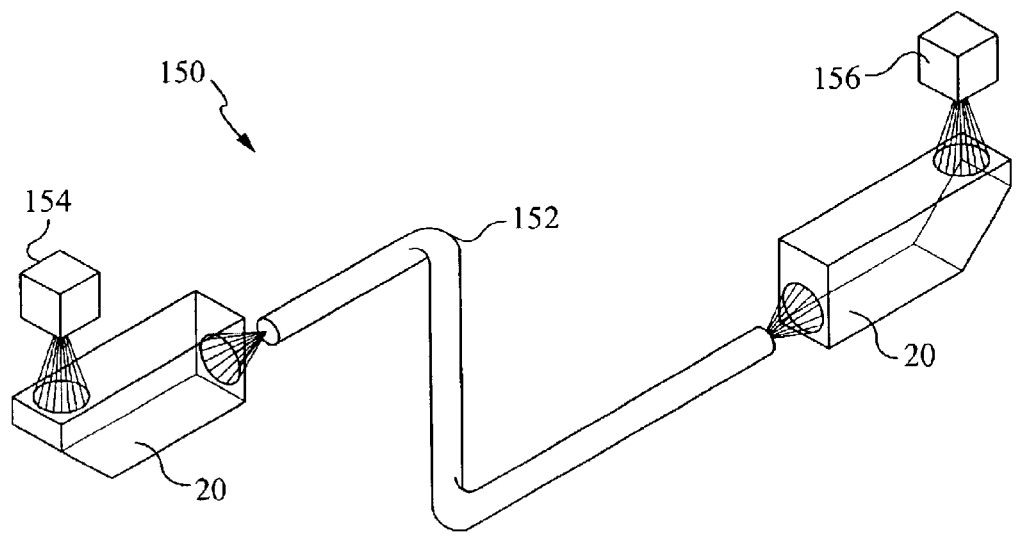
FIG. 13 illustrates a first alternative optical communication arrangement of the present invention.

The first alternative optical communication arrangement of the present invention is illustrated isometrically in FIG. 13. The first alternative optical communication arrangement 150 comprises two of the first alternative couplers 20, a first optical fiber 152, a light detector 154, and a light source 156. Preferably, the light detector is a first photodiode. Preferably, the light source is a laser. More preferably, the light source is a first VCSEL. Alternatively, the light source is a light emitting diode.

One of the first alternative couplers 20 optically couples the light detector 154 to the first optical fiber 152. The other of the first alternative couplers optically couples the light source 156 to the first optical fiber 152. In operation, the light source 156 emits a first optical signal, which couples to the light detector 154 via the two first alternative optical couplers 20 and the optical fiber 152.

Figure 14:
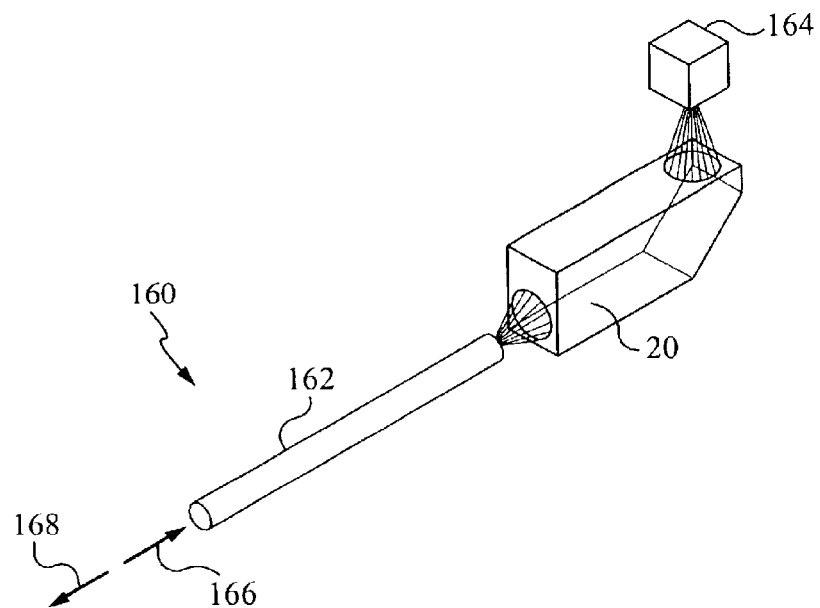
FIG. 14 illustrates a second alternative optical communication arrangement of the present invention.

The second alternative optical communication arrangement of the present invention is illustrated isometrically in FIG. 14. The second alternative optical communication arrangement 160 comprises one of the first alternative optical couplers 20, a second optical fiber 162, and an optical transceiver 164. The optical transceiver 164 comprises a second photodiode and a second VCSEL. The first alternative optical coupler optically couples the optical transceiver 164 to the second optical fiber 162. In operation, a second optical signal 166 couples from the second optical fiber 162 to the second photodiode of the optical transceiver 164 via the first alternative optical coupler 20. Also in operation, a third optical signal 168 couples from the second VCSEL of the optical transceiver 164 to the second optical fiber 162 via the first alternative optical coupler 20.

Figure 15A:
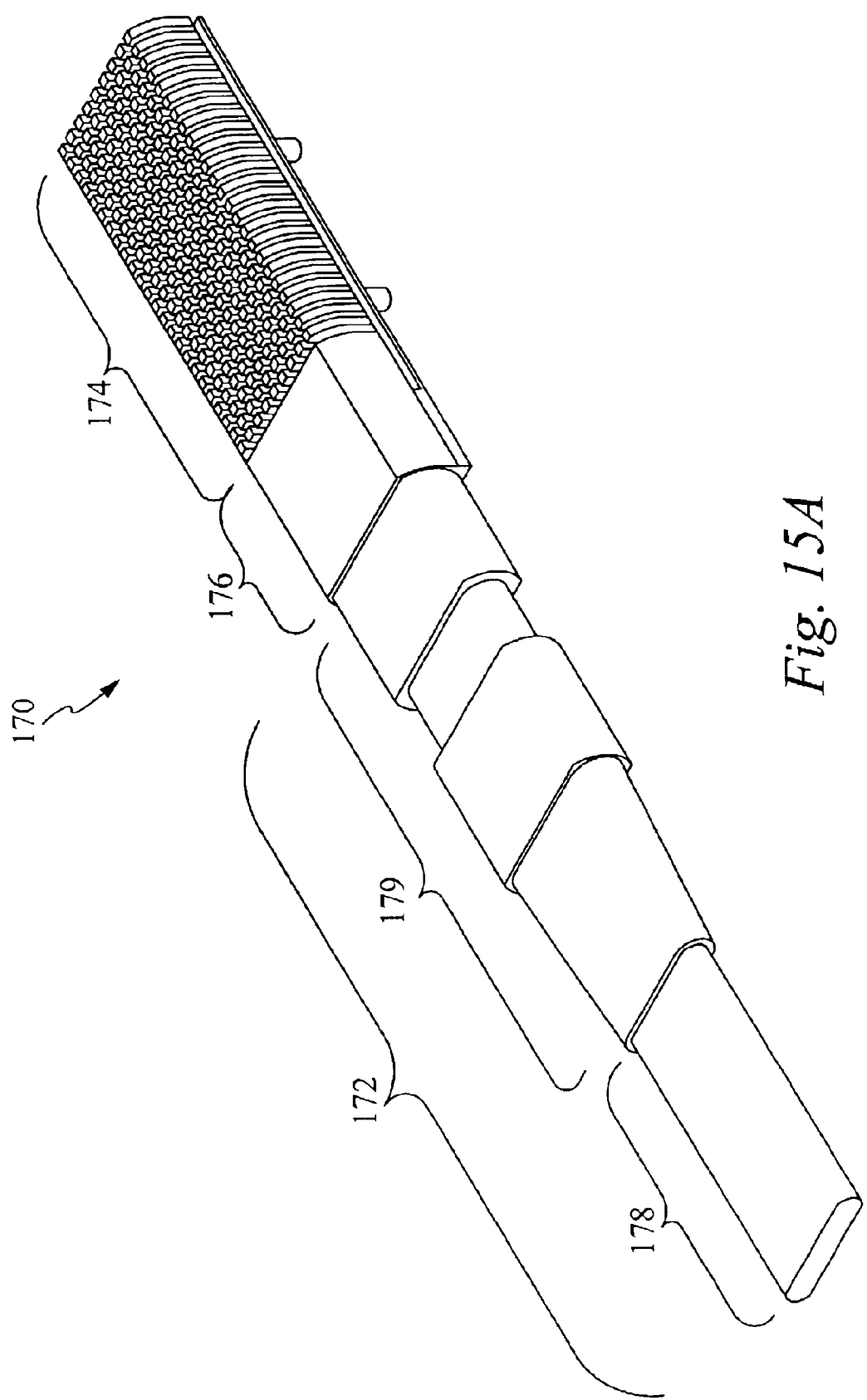
FIGS. 15A and 15B illustrate the preferred optical communication arrangement of the present invention.
Figure 15B:
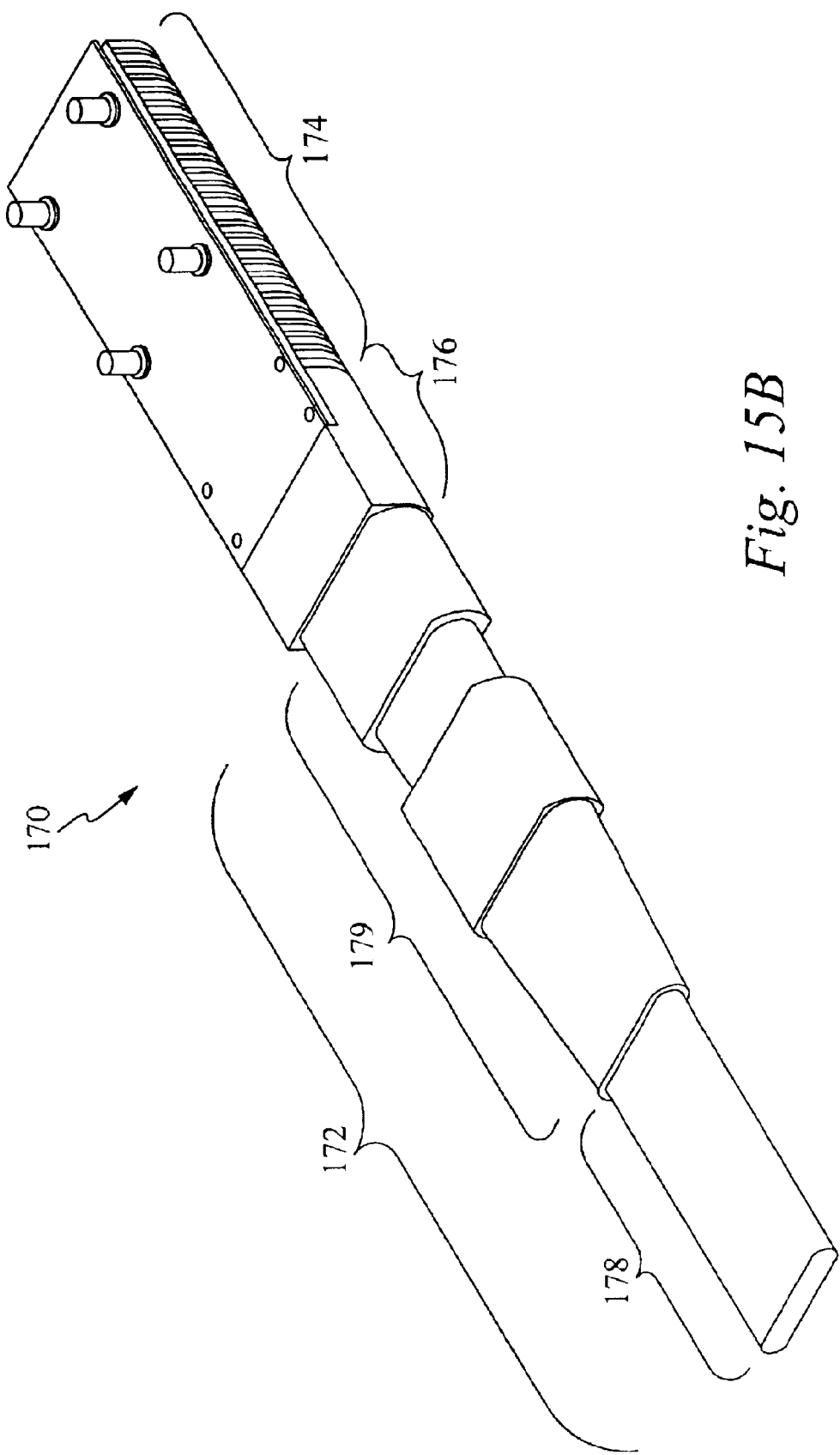

The preferred optical communication arrangement of the present invention are illustrated isometrically in FIGS. 15A and 15B. FIG. 15A illustrates a top view of the preferred optical communication arrangement 170 and FIG. 15B illustrates a bottom view of the preferred optical communication arrangement 170. The preferred optical communication arrangement 170 comprises the preferred optical coupler 70 (not shown in FIGS. 15A or 15B), an optical fiber connector assembly 172, an opto-electronic package 174, and a retaining sleeve 176. The optical fiber connector assembly 172 comprises a fiber cable 178 and an optical connector assembly 179. Preferably, the optical connector assembly 179 is an MPO connector assembly. The MPO connector assembly is also known as an MTP® connector assembly. (MTP is a registered trademark of US Conec Ltd.) More preferably, the optical connector assembly 179 comprises an MPO female plug. Alternatively, the optical connector assembly 179 comprises an MPO male plug. Further alternatively, the optical connector assembly 179 comprises a non-MPO connector assembly.

Figure 16:
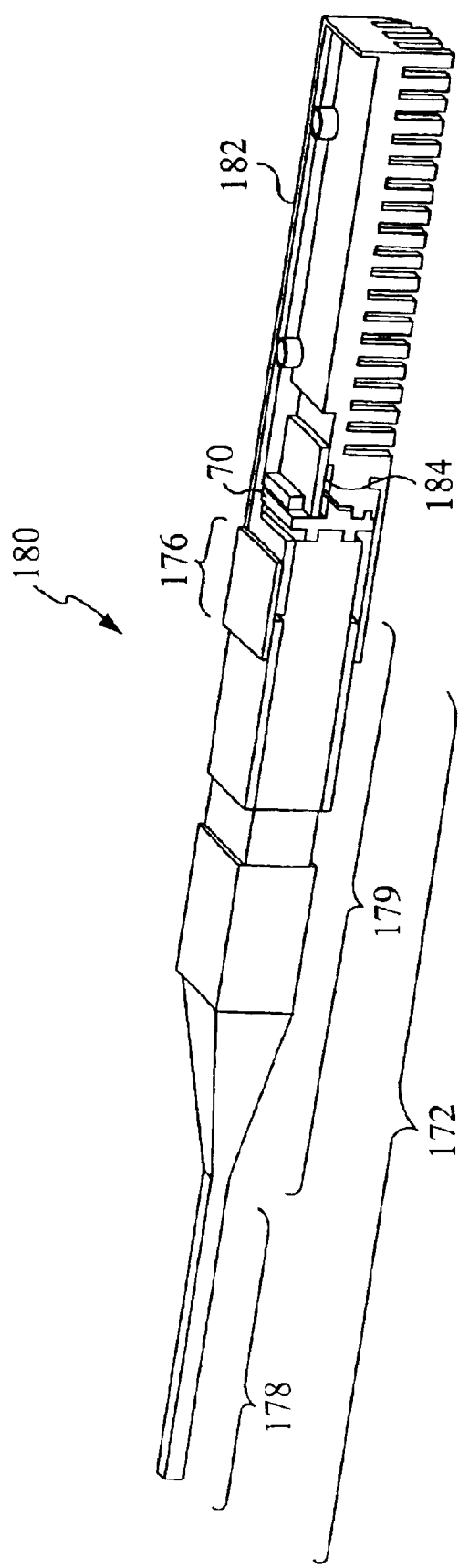
FIG. 16 illustrates a first partially disassembled cross-section of the preferred optical communication arrangement of the present invention.

A first partially disassembled cross-section of the preferred optical communication arrangement 170 of the present invention is illustrated isometrically in FIG. 16. The first partially disassembled cross-section 180 comprises the optical fiber connector assembly 172, the heatsink 182, the retaining sleeve 176, the preferred optical coupler 70, and the opto-electronic board 184. The optical fiber connector assembly 172 comprises the fiber cable 178, the optical connector assembly 179, and an array of optical fibers (not shown). The optical fiber connector assembly 172 is coupled to the preferred optical coupler 70. The preferred optical coupler 70 and the retaining sleeve 176 are coupled to the heatsink 182. The opto-electronic board 184 is coupled to the heatsink 182. Preferably, the opto-electronic board 184 is coupled to the heatsink by epoxy. Alternatively, the opto-electronic board 184 is coupled to the heatsink by another fastener.

Figure 17A:
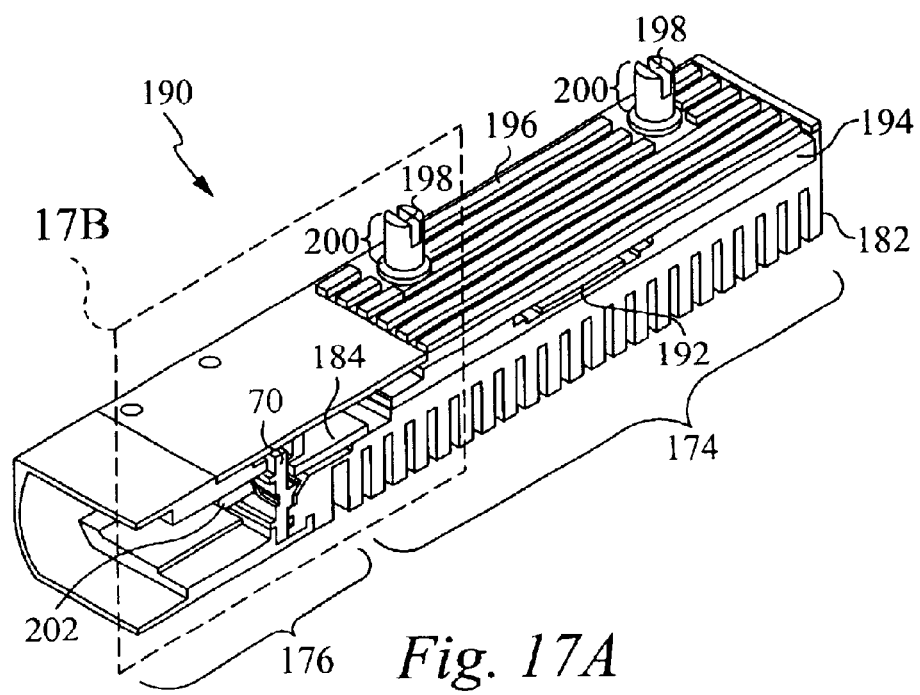
FIGS. 17A and 17B illustrate a second partially disassembled cross-section of the preferred optical communication arrangement of the present invention.
Figure 17B:
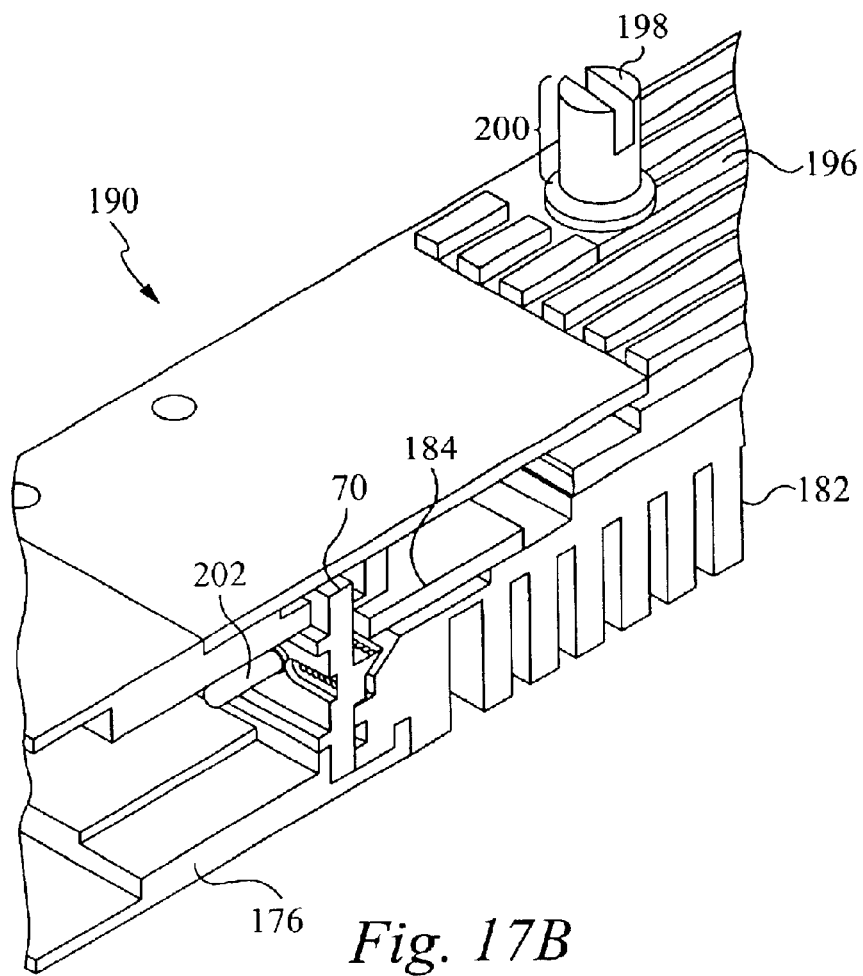

A second partially disassembled cross-section of the preferred optical communication arrangement 170 of the present invention is illustrated isometrically in FIGS. 17A and 17B. The second partially disassembled cross-section 190 comprises the preferred optical coupler 70, the opto-electronic package 174, and the retaining sleeve 176. The opto-electronic package 174 comprises the heatsink 182, the opto-electronic board 184, a SERDES (serializer-deserializer) IC 192, a land grid array board 194, an interposer connector 196, and screws 198. The SERDES IC 192, the land grid array board 194, the interposer connector 196, and the screws 198 are coupled to the heatsink 182. Preferably, the SERDES IC 192 is coupled to the land grid array board 194 via epoxy and wirebonds. The screws 198 retain the interposer connector 196 and, consequently, the land grid array board 194 which is underneath the interposer connector 196. Also, the screws 198 are threaded along protruding portions 200 of the screws 198, which are used with nuts to attach the opto-electronic package 174 to a structure.

A first alignment pin 202 and a second alignment pin of the heatsink 182 align the preferred optical coupler 70 to the heatsink 182. The first alignment pin 202 and the second alignment pin mate with the first and second alignment holes, 78 and 80, of the preferred optical coupler 70. The retaining sleeve 176 slips onto the heatsink 182 from below in FIGS. 17A and 17B to hold the preferred optical coupler 70 in place. The first alignment pin 202 and the second alignment pin guide the optical connector assembly 179 (FIG. 16) to mate with the preferred optical coupler 70. The optical connector assembly 179, via a spring loaded mechanism, latches to the retaining sleeve 176.

Figure 18A:
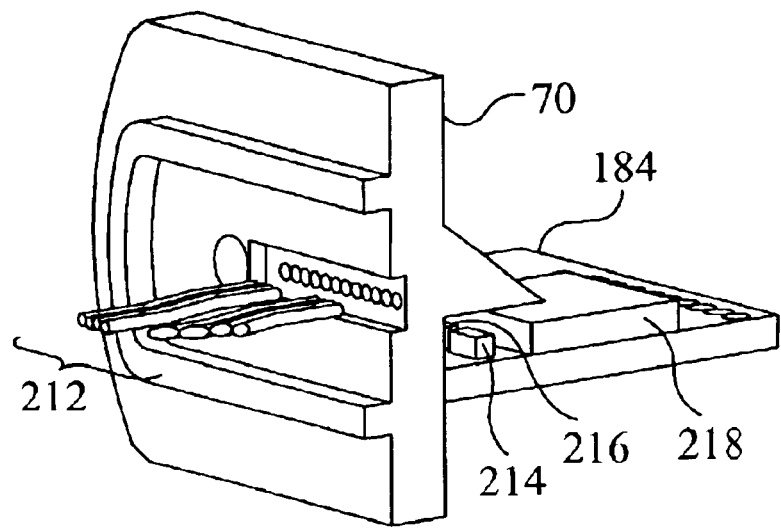
FIGS. 18A and 18B illustrate the preferred optical coupler, an opto-electronic board, and an array of optical fibers of the present invention.
Figure 18B:
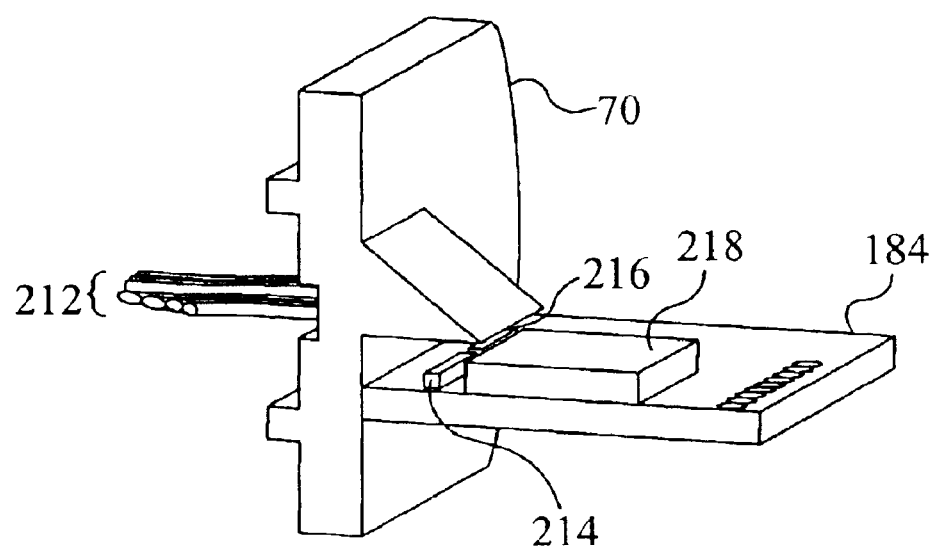

The preferred optical coupler 70, the opto-electronic board 184, and the array of optical fibers 212 are illustrated isometrically in FIGS. 18A and 18B. Preferably, the opto-electronic board 184 comprises an array of VCSELs 214, an array of photodiodes 216, and an opto-electronic IC 218. Preferably, the array of VCSELs 214 comprise four VCSELs packaged in a single die. Alternatively, the array of VCSELs 214 comprise more or less VCSELs. Preferably, the array of photodiodes 216 comprise four photodiodes packaged in a single die. Alternatively, the array of photodiodes 216 comprise more or less of photodiodes. Preferably, the opto-electronic IC 218 comprises a driver circuit for the array of VCSELs 214 and a pre-amplifier circuit for the array of photodiodes 216.

In operation, the four VCSELs of the array of VCSELs 214 each emit optical signals which couple to four of the array of optical fibers 212 via the preferred optical coupler 70. Further in operation, the remaining four optical fibers each provide an optical signal which couple to the array of photodiodes 216 via the preferred optical coupler 70.

It will be readily apparent to one skilled in the art that, if the array of VCSELs 214 comprise more or less VCSELs, the array of optical fibers 212 comprise more or less of optical fibers. Further, it will be readily apparent to one skilled in the art that, if the array of photodiodes 216 comprise more or less photodiodes, the array of optical fibers 212 comprise more or less of optical fibers.

Figure 19A:
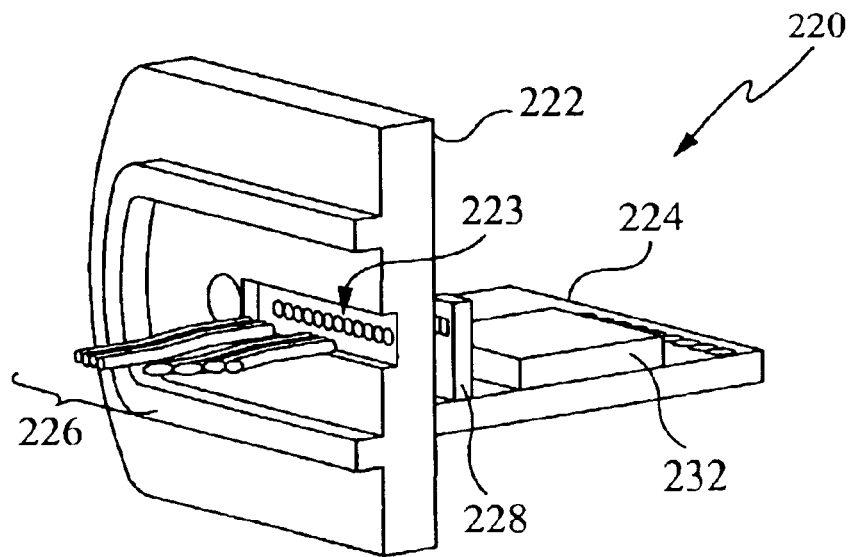
FIGS. 19A and 19B illustrate a third alternative optical communication arrangement of the present invention.
Figure 19B:
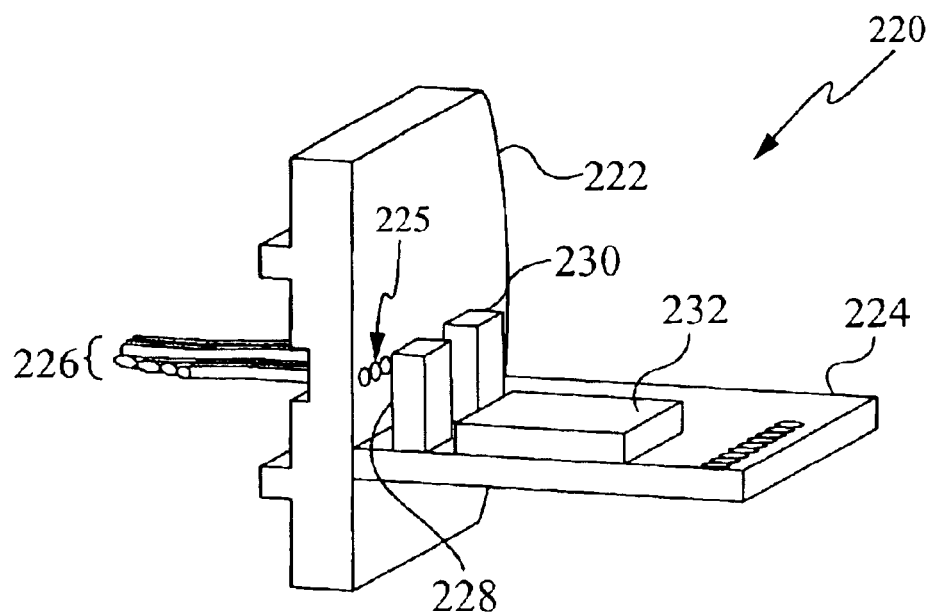

A third alternative optical communication arrangement of the present invention is illustrated isometrically in FIGS. 19A and 19B. The third alternative optical communication arrangement 220 comprises an eighth alternative optical coupler 222, a first alternative opto-electronic board 224, and a first alternative array of optical fibers 226. The eighth alternative optical coupler 222 comprises seventh and eighth pluralities of refraction surfaces, 223 and 225, which provide straight transmission paths through the eighth alternative optical coupler 222. Preferably, the opto-electronic board 224 comprises a first alternative array of VCSELs 228, a first alternative array of photodiodes 230, and a first alternative opto-electronic IC 232. Preferably, the first alternative array of VCSELs 228 comprise four VCSELs packaged in a single die with the four VCSELs arranged to emit light parallel to the first alternative opto-electronic board 224. Alternatively, the first alternative array of VCSELs 228 comprise more or less VCSELs. Preferably, the first alternative array of photodiodes 230 comprise four photodiodes packaged in a single die with the photodiodes oriented to receive light that is parallel to the first alternative opto-electronic board 224. Alternatively, the first alternative array of photodiodes 230 comprise more or less of photodiodes. In operation, the first alternative array of VCSELs 228 emit light which couples into the optical fibers via the straight transmission paths of the eighth alternative optical coupler 222.

Figure 20:
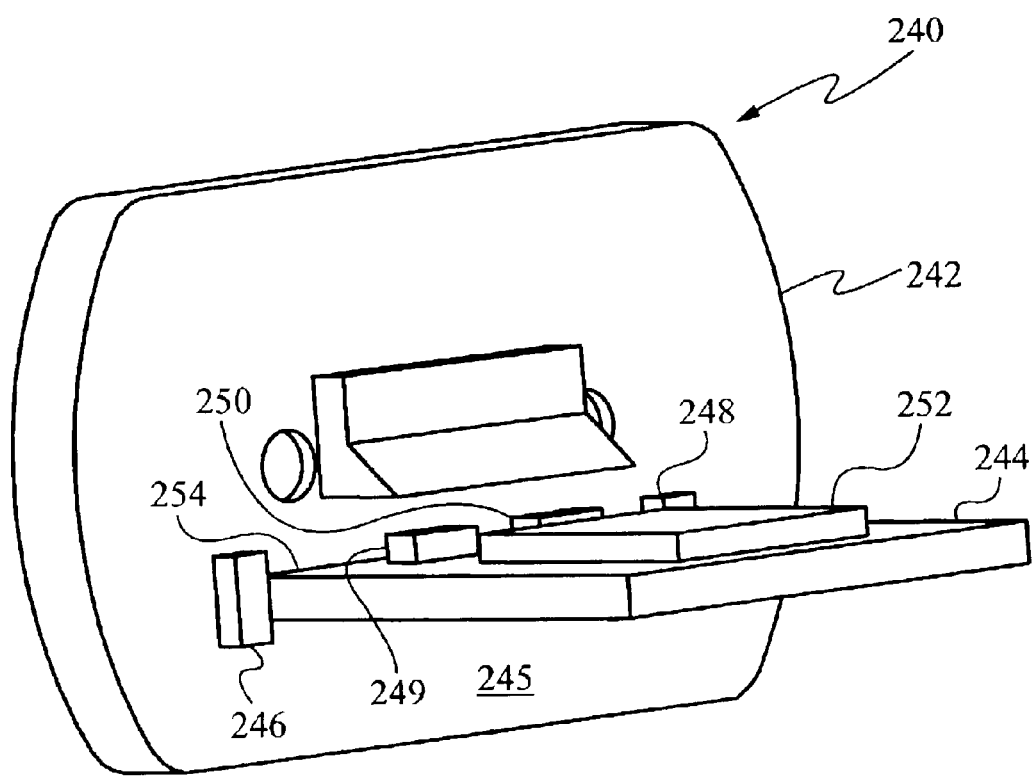
FIG. 20 illustrates a fourth alternative optical communication arrangement of the present invention.

A fourth alternative optical communication arrangement of the present invention is illustrated in FIG. 20. The fourth alternative optical communication arrangement 240 comprises a ninth alternative optical coupler 242 and a second alternative opto-electronic board 244. The ninth alternative optical coupler 242 comprises an opto-electronic board mating surface 245, and first and second ribs, 246 and 248. The second alternative opto-electronic board 244 comprises a second alternative array of VCSELs 249, a second alternative array of photodiodes 250, a second alternative opto-electronic IC 252, and a coupler mating edge 254. In the fourth alternative optical communication arrangement 240, the opto-electronic board mating surface 245, and the first and second ribs, 246 and 248, of the ninth alternative optical coupler 242 provide alignment for the coupler mating edge 254 of the second alternative opto-electronic board 244. Thus, the fourth alternative optical communication arrangement 240 provides an aligning feature for self aligning of the second alternative opto-electronic board 244 to the ninth alternative optical coupler 242.

It will be readily apparent to one skilled in the art that the self aligning feature can be provided by other methods such as by a key and a slot or by a pin and a hole.

It will be readily apparent to one skilled in the art that other various modifications may be made to the embodiments without departing from the spirit and scope of the invention as defined by the appended claims.

We claim:

1. An optical communication arrangement comprising:
    a. an optical coupler comprising a first refraction surface having a first finite focal length, a second refraction surface having a second finite focal length, and an internal reflector such that in operation a first optical signal enters the first refraction surface, couples from the first refraction surface to the second refraction surface via the internal reflector, and exits the second refraction surface, the first optical signal thereby defining a light path;
    b. an opto-electronic component optically coupled to the light path of the optical coupler; and
    c. an optical fiber optically coupled to the light path of the optical coupler;
    wherein:
        i. the opto-electronic component comprises a vertical cavity surface emitting laser, the opto-electronic component optically couples to the first refraction surface of the optical coupler;
        ii. the optical fiber optically couples to the second refraction surface of the optical coupler;
        iii. the first optical signal couples from the opto-electronic component to the optical fiber via the optical coupler;
        iv. a second optical signal couples from the optical fiber to the second refraction surface, couples from the second refraction surface to the first refraction surface via the internal reflector, and couples from the first refraction surface to the opto-electronic component; and
        v. the opto-electronic component further comprises a transceiver, the transceiver comprising the vertical cavity surface emitting laser and a photo-diode.

2. An optical communication arrangement comprising:
    a. an optical coupler comprising an internal reflector and first through fourth refraction surfaces having first through fourth finite focal lengths, respectively;
    b. a light source optically coupled to the first refraction surface of the optical coupler such that in operation the light source emits a first optical signal and further such that in operation the first optical signal enters the first refraction surface of the optical coupler, couples from the first refraction surface to the second refraction surface via the internal reflector, and exits the second refraction surface;
    c. a first optical fiber optically coupled to the second refraction surface of the optical coupler such that in operation the first optical signal couples to the first optical fiber;
    d. a light detector optically coupled to the third refraction surface of the optical coupler; and
    e. a second optical fiber optically coupled to the fourth refraction surface of the optical coupler such that in operation the second optical fiber emits a second optical signal and further such that in operation the second optical signal enters the fourth refraction surface, couples from the fourth refraction surface to the third refraction surface via the internal reflector, exits the third refraction surface, and couples to the light detector.

3. The arrangement of claim 2 wherein the internal reflector comprises a total internal reflection surface.

4. The arrangement of claim 2 wherein the internal reflector comprises a metal reflector.

5. The arrangement of claim 2 wherein the internal reflector comprises a multilayer dielectric reflector.

6. The arrangement of claim 2 wherein the light source comprises a laser.

7. The arrangement of claim 6 wherein the laser comprises a vertical cavity surface emitting laser.

8. The arrangement of claim 7 therein the light detector comprises a photodiode.

9. The arrangement of claim 8 further comprising an opto-electronic board, wherein the vertical cavity surface emitting laser and the photodiode mechanically couple to the opto-electronic board.

10. The arrangement of claim 9 further comprising an optical fiber connector, wherein the first and second optical fibers mechanically couple to the optical fiber connector.

11. The arrangement of claim 10 further comprising a heat sink mechanically coupled to the opto-electronic board.

12. The arrangement of claim 11 wherein the optical coupler further comprises alignment features, the alignment features aligning the optical fiber connector to the optical coupler and aligning the optical connector to the opto-electronic board via the heat sink.

13. The arrangement of claim 12 wherein the alignment features of the optical coupler comprise an optical fiber connector mating surface, a heat sink mating surface, and a pair of first alignment holes through the optical coupler.

14. The arrangement of claim 13 wherein the optical fiber connector comprises a pair of second alignment holes into the optical fiber connector.

15. The arrangement of claim 14 wherein the heat sink further comprises a pair of alignment pins, the pair of alignment pins extending through the pair of first alignment holes through the optical coupler and extending into the pair of second alignment holes into the optical fiber connector.

16. The arrangement of claim 13 wherein the heat sink comprises a pair of second alignment holes into the heat sink.

17. The arrangement of claim 16 wherein the optical fiber connector further comprises a pair of alignment pins, the pair of alignment pins extending through the pair of first alignment holes through the optical coupler and extending into the pair of second alignment holes into the heat sink.

18. The arrangement of claim 11 wherein the optical coupler further comprises alignment features, the alignment feature aligning the optical fiber connector to the optical coupler and aligning the optical connector to the opto-electronic board.

19. An arrangement for optical communication comprising:
  a. an optical coupler comprising:
    i. a plurality of first refraction surfaces each having a first finite focal length and a first optical axis;
    ii. an internal reflector folding the first optical axes of the plurality of first reflection surfaces, thereby forming a plurality of second optical axes;
    iii. a plurality of second refraction surfaces optically aligned to the plurality of second optical axes, each second refraction surface having a second finite focal length; and
    iv. a body comprising first and second alignment surfaces and first and second alignment holes;
  b. a laser source optically coupled to one of the plurality of first refraction surfaces;
  c. a photodiode optically coupled to another of the plurality of first refraction surfaces;
  d. an opto-electronic board mechanically coupled to the laser source and the photodiode;
  e. an optical fiber connector assembly comprising a plurality of optical fibers and an optical fiber connector, the plurality of optical fibers optically coupled to the plurality of second refraction surfaces, the first alignment surface and the first and second alignment holes of the optical coupler aligning the plurality of optical fibers to the plurality of second refraction surfaces via the optical fiber connector; and
  f. a heat sink mechanically coupled to the opto-electronic board and the optical coupler, the second alignment surface and the first and second alignment holes of the optical coupler aligning the laser source and the photodiode to the plurality of first refraction surfaces.

20. The arrangement of claim 19 wherein the internal reflector comprises a total internal reflection surface.

21. The arrangement of claim 19 wherein the internal reflector comprises a metal reflector.

22. The arrangement of claim 19 wherein the internal reflector comprises a multilayer dielectric reflector.

23. The arrangement of claim 19 wherein the first refraction surfaces comprise aspherical refraction surfaces.

24. The arrangement of claim 19 wherein the first refraction surfaces comprise spherical refraction surfaces.

25. The arrangement of claim 19 wherein the second refraction surfaces comprise aspherical refraction surfaces.

26. The arrangement of claim 19 wherein the second refraction surfaces comprise spherical refraction surfaces.

\* \* \* \* \*